United States Patent
Rounds

(10) Patent No.: US 11,650,324 B2
(45) Date of Patent: May 16, 2023

(54) NAVIGATION APPARATUS AND METHOD IN WHICH MEASUREMENT QUANTIZATION ERRORS ARE MODELED AS STATES

(71) Applicant: Deere & Company, Moline, IL (US)

(72) Inventor: Stephen F. Rounds, San Clemente, CA (US)

(73) Assignee: DEERE & COMPANY, Moline, IL (US)

( * ) Notice: Subject to any disclaimer, the term of this patent is extended or adjusted under 35 U.S.C. 154(b) by 213 days.

(21) Appl. No.: 17/235,856

(22) Filed: Apr. 20, 2021

(65) Prior Publication Data

US 2021/0341624 A1    Nov. 4, 2021

Related U.S. Application Data

(60) Provisional application No. 63/019,213, filed on May 1, 2020.

(51) Int. Cl.
*G01S 19/07* (2010.01)
*G01S 19/14* (2010.01)
(Continued)

(52) U.S. Cl.
CPC .......... *G01S 19/07* (2013.01); *B60W 60/001* (2020.02); *G01S 19/14* (2013.01); *G01S 19/25* (2013.01); *B60W 2556/60* (2020.02)

(58) Field of Classification Search
CPC .......... G01S 19/07; G01S 19/14; G01S 19/25; B60W 60/001; B60W 2556/60
See application file for complete search history.

(56) References Cited

U.S. PATENT DOCUMENTS

| 10,393,879 | B2 * | 8/2019 | Saito | G01S 19/071 |
| 2010/0117894 | A1 * | 5/2010 | Velde | G01S 19/48 |
| | | | | 342/357.36 |
| 2022/0155465 | A1 * | 5/2022 | Gao | G01S 19/14 |

FOREIGN PATENT DOCUMENTS

WO    WO-2012128980 A1 *    9/2012    ............. G01S 19/04

OTHER PUBLICATIONS

Deere & Company, International Search Report and Written Opinion, PCT/US2021/028606, Aug. 3, 2021, 15 pgs.
(Continued)

*Primary Examiner* — Peter D Nolan
*Assistant Examiner* — Kenneth M Dunne
(74) *Attorney, Agent, or Firm* — Morgan, Lewis & Bockius LLP

(57) ABSTRACT

A navigation apparatus determines an estimated position of an object. Navigation information that includes a sequence of quantized measurements is received. Each quantized measurement has a corresponding quantization error that is negatively correlated with the quantization error of a prior quantized measurement. The apparatus iteratively performs a navigation update operation that includes determining a state and a covariance matrix of the object for a current iteration based on a state and covariance matrix in a prior iteration. The state includes an end quantization error and a start quantization error. The covariance matrix includes end and start covariance values corresponding to the end and start quantization errors, respectively. Determining the state and the covariance matrix for the current iteration includes replacing the start quantization error with the end quantization error determined in a prior iteration, and updating the state and the covariance matrix via a Kalman filter update operation.

20 Claims, 13 Drawing Sheets

(51) Int. Cl.
*B60W 60/00* (2020.01)
*G01S 19/25* (2010.01)

(56) References Cited

OTHER PUBLICATIONS

Xu Jian et al: "Quantised innovation Kalman filter: performance analysis and design of quantised level", IET Signal Processing, The Institution of Engineering and Technology, Michael Faraday House, Six Hills Way, Stevenage, Herts. SG1 2AY, UK, vol. 8, No. 7, Sep. 1, 2014 (Sep. 1, 2014), pp. 759-773, XP006049625, ISSN: 1751-9675, DOI: 10.1049/IET SPR.2012.0306 the entire document, in particular algorithm 2.

Jian Xu et al: "Convergence of Kalman filter with quantized innovations", Control Automation Robotics & Vision (ICARCV), 2010 11th International Conference, IEEE Dec. 7, 2010 (Dec. 7, 2010), pp. 1703-1708, XP031900099, DOI: 10.1109/ICARCV.2010. 5707875, ISBN: 978-1-4244-7814-9, the entire document, in particular algorithm 2.

Quan-Bo Ge et al.: "Quantized State Estimation for Sensor Neterworks", Machine Learning and Cybernetics (ICMLC), 2010 International Conference on, IEEE, Piscataway, NJ, USA, Jul. 11, 2010, 3111-3116 pgs., XP031759818, ISBN: 978-1-4244-6526-2, entire document, in particular eq. (34)-(36) and remark 3.

Xiaoliang Xu et al., "Network Strong Tracking Filiters With Noise Correlations and Bits Quantization", Sep. 24, 2011, ICIAP: International Conference on Imaged Analysis and Processing, 17th Internatioal Conference, Naples, Italy, Sep. 9-13, 2013, Proceedings; (Lecture Notes in Computer Science), Springer, Berlin Heidelberg, 183-1, XP019166265, ISBN: 978-3-642-17318-9, the entire document, in particular section 4 and eq. (18).

Quan-Bo Ge et al.: "Network Kalman Filtering with Combined Constraints of Bandwidth and Random Delay", Science China Information Sciences, SP Science China Press, Heidelberg, vol. 55, No. 10, Aug. 4, 2012, 2343-2357, XP035111653, ISSN: 1869-1919, DOI: 10.1007/S11432-012-4624-5, section 3.3.

* cited by examiner $$
\text{Covariance matrix 570} \rightarrow
\begin{pmatrix}
\Delta x & \cdots & e_{1,(L-2)} & e_{1,(L-1)} = 0 & e_{1,L} = b_{1,(L-1)} \\
\vdots & \ddots & \vdots & \vdots & \vdots \\
e_{(L-2),1} & \cdots & e_{(L-2),(L-2)} & \cdot & \cdot \\
e_{(L-1),1} & \cdots & \cdot & e_{(L-1),(L-1)} = 0 & e_{(L-1),L} = b_{(L-1),1} \\
e_{L,1} & \cdots & \cdot & \cdot & e_{L,L} = b_{(L-1),(L-1)}
\end{pmatrix}
$$

portion 572 (left block), portion 574 (right block)

610 At a navigation apparatus for determining an estimated position of an object, receiving, over time, navigation information that include a sequence of quantized measurements. The navigation information corresponds to a position or a change in position of the object. Each quantized measurement has a corresponding quantization error and the quantization error of each quantized measurement is negatively correlated with the quantization error of prior quantized measurements in the sequence of quantized measurements.

620 At a sequence of times separated by time intervals, iteratively performing a navigation update operation:

630 Determine an estimated state of the object and an estimated state covariance matrix of the object for a current time in the sequence of times based on an estimated state and estimated state covariance matrix of the object for a prior time in the sequence of times. The estimated state of the object includes a first portion that includes at least estimated position values and estimated velocity values, and a second portion that includes an interval end quantization error value and an interval start quantization error. The estimated state covariance matrix of the object includes a first portion that includes covariance values for the first portion of the estimated state, and a second portion that includes end and start covariance values corresponding to the interval end and interval start quantization error values, respectively, in the second portion of the estimated state.

640 Replace the interval start quantization error value in the estimated state with the interval end quantization error value determined in a prior iteration of the navigation update operation.

650 Update the estimated state and the estimated state covariance matrix in accordance with a predefined Kalman filter update operation to generate the estimated state of the object and the estimated state covariance matrix of the object for the current time.

Ⓓ Ⓑ

Figure 6A

```
┌─────────────────────────────────────────────────────────────┐
│  652 Updating the estimated state and the estimated state   │
│ covariance matrix comprises updating the estimated state and│
│  the estimated state covariance matrix, using the predefined│
│   Kalman filter update operation, in accordance with a most │
│  recent quantized measurement in the sequence of quantized  │
│                        measurements.                        │
└─────────────────────────────────────────────────────────────┘
```

```
┌─────────────────────────────────────────────────────────────┐
│   654 Use a Kalman gain function that includes a noise      │
│  measurement matrix corresponding to the first measurement  │
│  receiver. The noise measurement matrix corresponding to the│
│            first measurement receiver is zero.              │
└─────────────────────────────────────────────────────────────┘
```

```
┌─────────────────────────────────────────────────────────────┐
│  656 Use a Kalman gain function that includes a sensitivity │
│      matrix. The sensitivity matrix includes an interval end│
│     quantization error sensitivity value corresponding to the│
│    interval end quantization error value and an interval start│
│      quantization error sensitivity value corresponding to the│
│       interval start quantization error value. The interval end│
│      quantization error sensitivity value and the interval start│
│   quantization error sensitivity value are equal in magnitude and│
│                        opposite in sign.                    │
└─────────────────────────────────────────────────────────────┘
```

Figure 6C

NAVIGATION APPARATUS AND METHOD IN WHICH MEASUREMENT QUANTIZATION ERRORS ARE MODELED AS STATES

RELATED APPLICATIONS

This application claims priority to U.S. Provisional Patent Application No. 63/019,213, filed May 1, 2020, which is hereby incorporated by reference in its entirety.

TECHNICAL DATA FIELD

The disclosed embodiments relate generally to navigation systems which determine the position, and optionally one or more of velocity, attitude and/or acceleration of the navigation systems or of mobile or moveable objects associated with the navigation systems, and updating positioning information in navigation systems using measurements or navigation information having quantization errors. More particularly, the disclosed embodiments relate to modeling quantization errors used for updating positioning information in navigation systems.

BACKGROUND

Receivers in global navigation satellite systems (GNSS), such as Global Positioning System (GPS), use range measurements that are based on line-of-sight signals from satellites. The signal strength received by the GPS receivers is weak, approximately $10^{-16}$ watts, and therefore susceptible to interference caused by a variety of environmental factors including natural obstructions (e.g., trees, canyons), man-made physical obstructions (e.g., buildings, bridges), and electromagnetic interference (e.g., signal jammers, electronic equipment emitting wideband or narrow band noise). These reliability factors, along with accuracy limitations, are primary concerns that limit the adoption of GPS, or require supplementing GPS, in markets like the booming commercial autonomous vehicle industry. It is noted that all references to "GPS" systems and navigation methodologies in this document are understood to include all GNSS-based systems and navigation systems.

An approach to improving position information for a mobile object is to utilize one or more measurement receivers that acquire a sequence of quantized measurements from one or more measurement sensors (e.g., encoder, odometer, GNSS signal receiver for measuring quantized GNSS signal phases) to estimate and update position information of a mobile object. In some cases, quantized measurements are used independently from GPS signals (e.g., for short periods or time, or in parallel with GPS-based updates) to determine and update the estimated position of a mobile object, allowing for accurate position estimates of the mobile object even when GPS signals become obstructed.

SUMMARY

To address reliability and accuracy concerns, navigation information from a measurement receiver can be used to update positioning information of a mobile object using a Kalman filter. Updates to a position of a mobile object using measurements from a measurement receiver can be useful when GPS signals are weak or unreliable, as well to provide position updates between GPS signal-based updates. It is noted that the term "position updates" in this document is understood to include all relevant state vector updates, and thus, where applicable, to include updates of velocity, and/or acceleration, and optionally other state values such as attitude or sensor errors, of a navigation apparatus or a mobile or moveable object associated with the navigation apparatus. In this document, a mobile or moveable object associated with the navigation apparatus is understood to be a mobile or moveable object in which the navigation apparatus is embedded, a mobile or moveable object to which the navigation apparatus is attached, or a mobile or moveable object in communication (e.g., using wireless communications) with the navigation apparatus.

Position updates for the mobile object based on information received from a measurement receiver may be computed independently and/or in parallel with position updates mobile object that are based on GPS signals. In some cases, and typically, the information received at measurement receivers are quantized measurements that have quantization errors. The quantization errors can be modeled as part of the estimated state (e.g., estimated state of the mobile object), sometimes herein called the Kalman state or Kalman filter state, thereby providing improved accuracy in estimates of the mobile object's positioning information, and optionally providing an improved figure of merit, such as an estimate of the accuracy or reliability of the estimated positioning information. By modeling the quantization error of quantized measurements in the estimate state rather than in a noise measurement matrix, the accumulated error associated with a sequence of the quantized measurements can be accurately modeled and estimated.

In contrast, when updating the estimated position of the mobile object in accordance with a traditional Kalman filter update operation, the quantization error is modeled using a noise measurement matrix. This traditional method results in an increase in the accumulated error as the number of measurements or number of update iterations increases (e.g., the estimated error of updated position information increases with an increase in number of update iterations). This apparent growth in the accumulated error does not accurately reflect the total amount error of the measurements received from measurement acquisition mechanism. However, the total error in the quantized measurements over multiple measurements does not grow with time or number or measurements, and instead is bounded by a fixed quantity associated with the quantization error of any one measurement. Thus, the methods, systems, and apparatus disclosed herein allow for quantization errors of quantization measurements to be more accurately estimated compared to traditional Kalman filtering methods, thereby avoiding or mitigating the inaccurate result that cumulative error associated with a sequence of received quantized measurements increases with the number of measurements or the number of position update calculations.

Some embodiments provide a system (e.g., a navigation apparatus), computer readable storage medium storing instructions, or a method for determining an estimated position of an object according to navigation information from one or more measurement receivers.

(A1) In the method for determining an estimated position of an object, a navigation apparatus receives navigation information corresponding to a position or change in position of the object from one or more measurement receivers. A first measurement receiver of the one or more measurement receivers receives, over time, navigation information comprising a sequence of quantized measurements (e.g., measurements distinct from the pseudo-ranging estimates produced by a GPS or GNSS system or sub-system). Each of the quantized measurements has a corresponding quantization error. In some embodiments, the quantization error of each quantized measurement in the sequence of quantized measurements is negatively correlated with the quantization error of the prior quantized measurement, or stated somewhat differently, the quantization error of each quantized measurement is negatively correlated with the quantization error of prior quantized measurements in the sequence of quantized measurements. The method generates, from the quantized measurements, estimated positions of the object. The method includes iteratively performing a navigation update operation at a sequence of times separated by time intervals. The navigation update operation includes determining an estimated state of the object and an estimated state covariance matrix of the object for a current time (e.g., current iteration, a $k^{th}$ iteration) in the sequence of times based on an estimated state and estimated state covariance matrix of the object for a prior time (e.g., prior iteration, a $(k-1)^{th}$ iteration) in the sequence of times. The estimated state of the object includes a first portion that includes at least estimated position values and estimated velocity values, and a second portion that includes an interval end quantization error value and an interval start quantization error value. The estimated state covariance matrix of the object includes a first portion that includes covariance values for the first portion of the estimated state, and a second portion that includes end and start covariance values corresponding to the interval end and interval start quantization error values, respectively, in the second portion of the estimated state. The navigation update operation also includes determining the estimated state of the object and the estimated state covariance matrix of the object for the current time (e.g., current iteration, the $k^{th}$ iteration). The method includes, in each iteration, replacing the interval start quantization error value in the estimated state with the interval end quantization error value determined in a prior iteration of the navigation update operation. The method also includes updating the estimated state and the estimated state covariance matrix in accordance with a predefined Kalman filter update operation to generate the estimated state of the object and the estimated state covariance matrix of the object for the current time (e.g., current iteration, the $k^{th}$ iteration).

(A1A) In some embodiments, the estimated state and the estimated state covariance matrix are updated, using the predefined Kalman filter update operation, in accordance with a respective quantized measurement in the sequence of quantized measurements (e.g., a quantized measurement received since a last iteration of the navigation update operation was performed).

(A2) In some embodiments of the method of A1 or A1A, determining the estimated state of the object and the estimated state covariance matrix of the object for the current time (e.g., current iteration, the $k^{th}$ iteration) includes replacing an element of the estimated state covariance matrix corresponding to the interval end quantization error value with a first predefined value. In some embodiments, the first predefined value is determined based on a largest quantization error (e.g., a predefined largest quantization error) of any respective quantized measurement in the sequence of quantized measurements (e.g., the amount of change in a quantized measurement if only the value least significant bit (LSB) value of quantized measurement is changed).

(A3) In some embodiments of the method of A2, determining the estimated state of the object and the estimated state covariance matrix of the object for the current time (e.g., current iteration, the $k^{th}$ iteration) includes replacing an element of the estimated state covariance matrix correspond-ing to the interval start quantization error value with a covariance value determined in a prior iteration of the navigation update operation.

(A4) In some embodiments of the method of any of A2-A3, determining the estimated state of the object and the estimated state covariance matrix of the object for the current time (e.g., current iteration, the $k^{th}$ iteration) includes replacing the interval end quantization error value in the estimated state with a second predefined value (e.g., zero).

(A5) In some embodiments of the method of any of A2-A4, updating the estimated state and the estimated state covariance matrix in accordance with the predefined Kalman filter update operation includes using a Kalman gain function that includes a noise measurement matrix that is equal to zero.

(A6) In some embodiments of the method of any of A2-A5, updating the estimated state and the estimated state covariance matrix in accordance with the predefined Kalman filter update operation includes using a Kalman gain function that includes a sensitivity matrix. The sensitivity matrix includes an interval end quantization error sensitivity value that corresponds to the interval end quantization error value and an interval start quantization error sensitivity value that corresponds to the interval start quantization error value. The interval end quantization error sensitivity value and the interval start quantization error sensitivity value are equal in magnitude and opposite in sign.

(A7) In some embodiments of the method of any of A1-A6, the method further includes generating one or more figures of merit, e.g., a figure of merit corresponding to the estimated stated determined for the current time. Each figure of merit is based on one or more diagonal elements of the estimated state covariance matrix (e.g., one or more diagonal elements of the estimated state covariance matrix determined for the current time, or a linear combination of one or more diagonal elements and one or more off-diagonal elements of the estimated state covariance matrix).

(A8) In some embodiments of the method of any of any of A1-A7, the estimated state covariance matrix also includes covariance values for any of, or one or more of: sensor bias errors, attitude of the object, and sensor errors.

(A9) In some embodiments of the method of any of A1-A8, the method includes reporting at least a portion of the estimated state (e.g., position and velocity, or position, attitude and velocity) of the object to a reporting apparatus (e.g., the user interface or user interface subsystem of a vehicle, which comprises the object; or a computer system external to the navigation apparatus) or other external system, external to the navigation apparatus. Optionally, a figure of merit is reported along with the portion of the estimated state to the reporting apparatus or external system.

(A10) In some embodiments of the method of any of A1-A9, the object is a mobile object.

(A11) In some embodiments of the method of any of A1-A10, the time intervals separating the sequence of times have a predetermined value.

(A12) In some embodiments of the method of any of A1-A11, the object includes at least one of the one or more measurement receivers.

(A14) In another aspect, in some embodiments, a navigation apparatus for an object comprises: one or more processors; one or more measurement receivers to receive navigation information corresponding to a position or change in position of the object; and memory storing one or more programs that include instructions for iteratively performing a navigation update operation at a sequence of times separated by time intervals. A first measurement receiver of the one or more measurement receivers receives, over time, navigation information comprising a sequence of quantized measurements. Each of the quantized measurements has a corresponding quantization error. In some embodiments, the quantization error of each quantized measurement in the sequence of quantized measurements is negatively correlated with the quantization error of the prior quantized measurement, or stated somewhat differently, the quantization error of each quantized measurement is negatively correlated with the quantization error of prior quantized measurements in the sequence of quantized measurements. The navigation update operation includes determining an estimated state of the object and an estimated state covariance matrix of the object for a current time (e.g., current iteration, the $k^{th}$ iteration) in the sequence of times based on an estimated state and estimated state covariance matrix of the object for a prior time (e.g., prior iteration, the $(k-1)^{th}$ iteration) in the sequence of times. The estimated state of the object includes a first portion that includes at least estimated position values and estimated velocity values, and a second portion that includes an interval end quantization error value and an interval start quantization error value. The estimated state covariance matrix of the object includes a first portion that includes covariance values for the first portion of the estimated state, and a second portion that includes end and start covariance values corresponding to the interval end and interval start quantization error values, respectively, in the second portion of the estimated state. The navigation update operation includes determining the estimated state of the object and the estimated state covariance matrix of the object for the current time (e.g., current iteration, the $k^{th}$ iteration). The navigation update operation further includes, in each iteration, replacing the interval start quantization error value in the estimated state with the interval end quantization error value determined in a prior iteration of the navigation update operation. The navigation update operation also includes updating the estimated state and the estimated state covariance matrix in accordance with a predefined Kalman filter update operation to generate the estimated state of the object and the estimated state covariance matrix of the object for the current time (e.g., current iteration, the $k^{th}$ iteration).

In some embodiments of the navigation apparatus of A14, the one or more programs include instructions for performing the method of any of A1 to A13.

(A15) In another aspect, in some embodiments, a computer readable storage medium stores one or more programs, the one or more programs including instructions that, when executed by one or more processors of a system (e.g., a navigation apparatus or navigation system) for navigating a mobile object according to signals from a plurality of satellites, perform a method comprising: receiving navigation information corresponding to a position or change in position of the object, including receiving, over time, navigation information comprising a sequence of quantized measurements. Each of the quantized measurements has a corresponding quantization error. In some embodiments, the quantization error of each quantized measurement in the sequence of quantized measurements is negatively correlated with the quantization error of the prior quantized measurement, or stated somewhat differently, the quantization error of each quantized measurement is negatively correlated with the quantization error of prior quantized measurements in the sequence of quantized measurements. The method also includes iteratively performing a navigation update operation at a sequence of times separated by time intervals. The navigation update operation includes determining an estimated state of the object and an estimated state covariance matrix of the object for a current time (e.g., current iteration, the $k^{th}$ iteration) in the sequence of times based on an estimated state and estimated state covariance matrix of the object for a prior time (e.g., prior iteration, the $(k-1)^{th}$ iteration) in the sequence of times. The estimated state of the object includes a first portion that includes at least estimated position values and estimated velocity values, and a second portion that includes an interval end quantization error value and an interval start quantization error value. The estimated state covariance matrix of the object includes a first portion that includes covariance values for the first portion of the estimated state, and a second portion that includes end and start covariance values corresponding to the interval end and interval start quantization error values, respectively, in the second portion of the estimated state. The navigation update operation further includes replacing the interval start quantization error value in the estimated state with the interval end quantization error value determined in a prior iteration of the navigation update operation. The navigation update operation also includes updating the estimated state and the estimated state covariance matrix in accordance with a predefined Kalman filter update operation to generate the estimated state of the object and the estimated state covariance matrix of the object for the current time (e.g., current iteration, the $k^{th}$ iteration).

In some embodiments of the one or more computer readable storage medium of A15, the one or more programs include instructions that, when executed by one or more processors of the system, cause the system to perform the method of any of A1 to A13.

BRIEF DESCRIPTION OF THE DRAWINGS

FIG. 5E is an example of an updated covariance matrix corresponding to a starting state of FIG. 5D, according to some embodiments;

FIGS. 6A-6D are flowcharts of a method for estimating a position of a mobile object, according to some embodiments.

DESCRIPTION OF EMBODIMENTS

Figure 1:
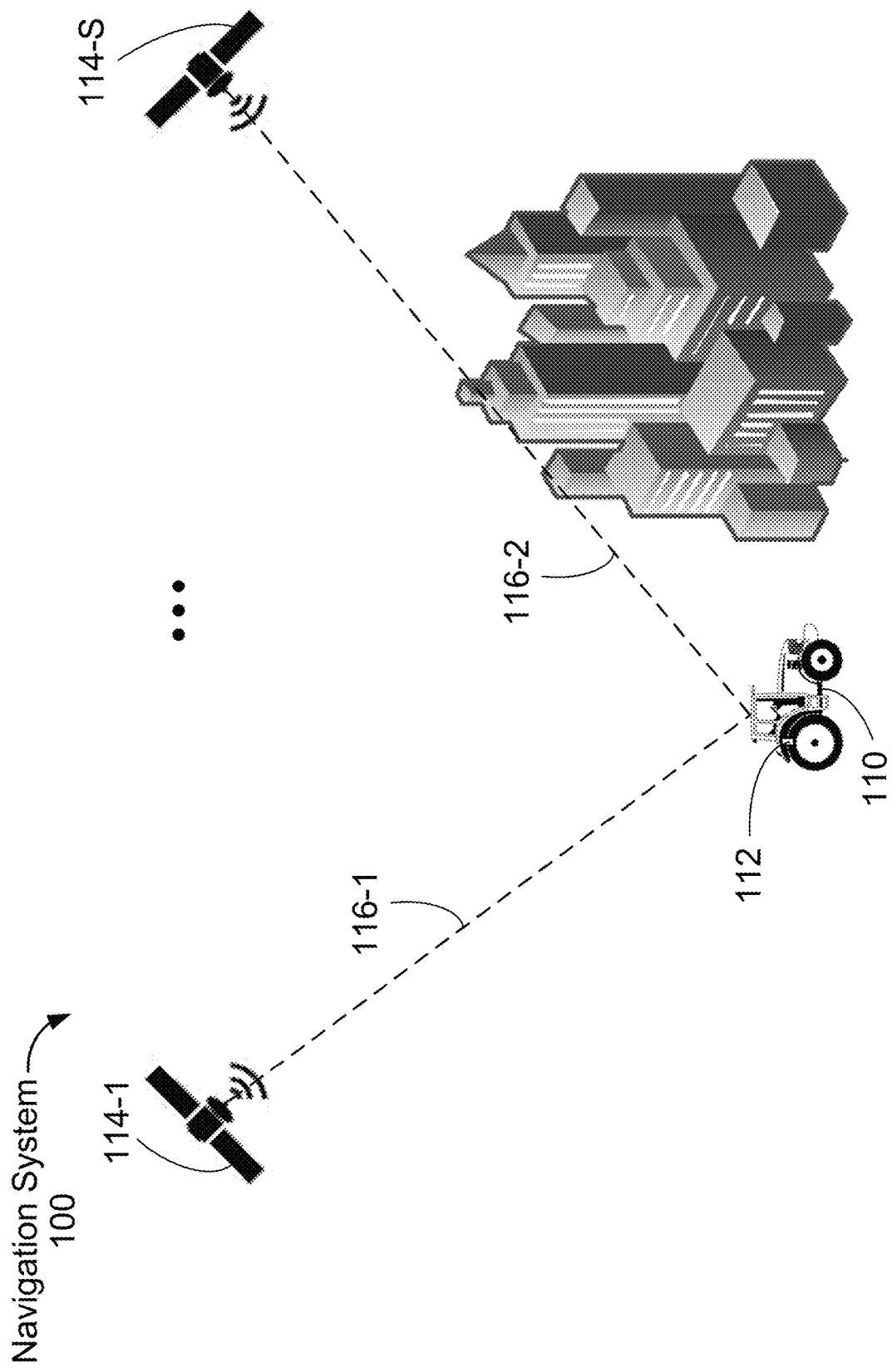
FIG. 1 is a block diagram illustrating a navigation system, according to some embodiments.

FIG. 1 is a block diagram illustrating a navigation system 100, according to some embodiments. Navigation system 100 enables the position, or more precisely an estimate of the position, of a mobile object 110 (e.g., a rover such as a motorized vehicle, e.g., a car, truck or tractor, or an object, such as a trailer, being hauled or otherwise moved by vehicle or other object) to be determined at any point of time. Mobile object 110 is sometimes called a moveable object, such as in embodiments in which mobile object 100 has wheels, but no propulsion system. The navigation system 100 includes one or more measurement receivers 112 that receive information from one or more measurement sensors 118 (e.g., an odometer, or an encoder, see FIG. 2), and optionally includes other measurement apparatus, such as one or more satellite signal receivers (e.g., GPS signal receiver, satellite antenna) that are configured to receive satellite navigation signals (e.g., GPS signals) from a plurality of more satellites (e.g., satellites 114-1 through 114-S, where S is an integer, typically having a value of at least 4) in view of the mobile object, referred to herein collectively as satellites 114). The navigation system 100 optionally includes mobile object 110.

The satellite navigation signals received in the navigation system are typically global navigation satellite system (GNSS) signals, such as Global Positioning System (GPS) signals at the 1575.42 MHz L1 signal frequency and, optionally, GPS signals at the 1227.6 MHz L2 signal frequency, or other navigation signals at other frequencies. The mobile object 110, or a navigation apparatus associated with mobile object 110 (e.g., a navigation apparatus attached to, embedded in or otherwise associated with mobile object 110), can be equipped with one or more of the measurement receivers 112 and, optionally, the other measurement apparatus, such as one or more satellite signal receivers. In some embodiments, the mobile object 110 or it's associated navigation apparatus is also equipped with one or more communication interfaces, such as one or more communication ports for wired communication with other devices, and/or wireless communication interfaces (e.g., include a radio transmitter and receiver) for wireless communications with external systems (e.g., for transmitting position information, such as a current position of the mobile object 110, or a relative position information concerning the relative position of mobile object 110 with respect to a previous position or mobile object 110).

An estimated position of the mobile object 110 is determined based, at least in part, on quantized measurements received at the one or more measurement receivers 112. In some embodiments, the estimated position of the mobile object 110 may also be determined based on satellite signals received from one or more satellites 114. In some embodiments, the estimated position is the mobile object 110 is an absolute position. In some embodiments, the estimated position of the mobile object 110 is represented by a differential position value, such as a relative position vector. In the following discussion, and throughout this document, the term "estimated position" means either an absolute position of the mobile object 110, or a relative position of the mobile object 110 relative to a prior position or a predetermined base position (e.g., an initial or a starting position).

In some embodiments, a navigation apparatus (e.g., navigation apparatus 200, FIG. 2) associated with mobile object 110 is configured to determine or generate an estimated position for the mobile object 110 based on quantized measurements that are received at predefined times or a sequence of times separated by intervals (e.g., at 0.1 second intervals). In some embodiments, the intervals separating the sequence of times have a predetermined value. In some embodiments, the navigation apparatus may also determine an estimated position of the mobile object 110 based on other forms of measurements, such as received satellite signals.

Figure 2:
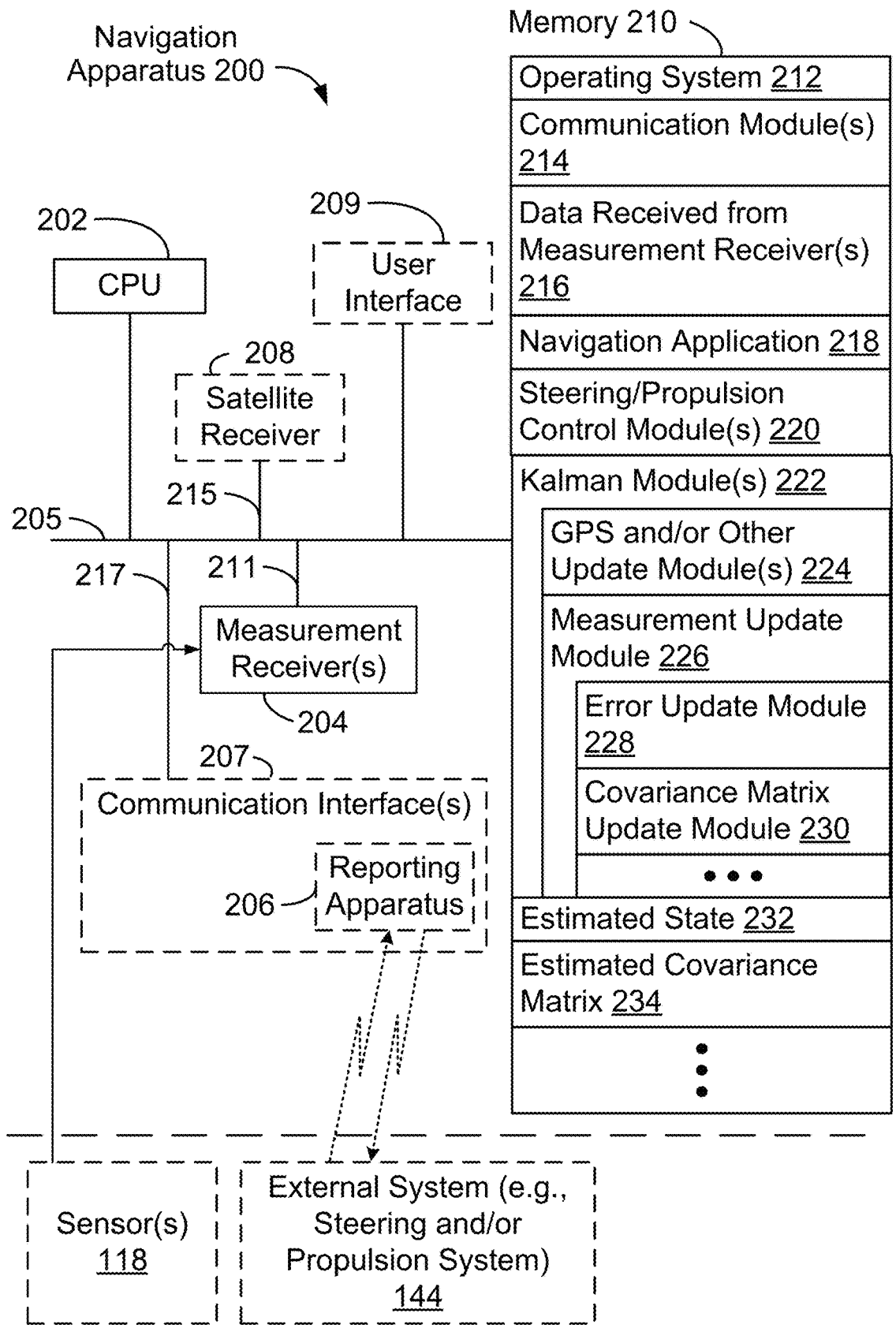
FIG. 2 is a block diagram illustrating a navigation apparatus associated with a mobile object of FIG. 1, according to some embodiments.

For example, the navigation apparatus (e.g., using measurement update module 226 of navigation apparatus 200, FIG. 2) may generate updated position estimates (or more generally, estimated states) for the mobile object 110 at a first set of intervals, such as intervals of 0.1 second, that occur a first rate (e.g., 10 Hz), based on quantized measurements (e.g., measurements of the amount of rotation of a wheel of the mobile object), and (e.g., using GPS or other update module 224 of navigation apparatus 200, FIG. 2) at a second set of intervals, such as intervals of 1.0 second, that occur at a second rate (e.g., 1 Hz) different from the first rate, based on received satellite signals, using two distinct position update processes or modules (e.g., modules 224 and 226, FIG. 2) that both update the same position estimate (or estimated state) for the mobile object 110.

In some embodiments, the estimated position for the mobile object 110 is determined by combining the estimated position for the mobile object 110 at a previous time (e.g., a start time or an initial time, or a time that is prior to current time) with the change in position at mobile object 110 between the current time and the previous time. In some implementations, the navigation apparatus is configured to generate updated estimated positions for the mobile object 110 at a rate that is greater than or equal to 10 Hz (e.g., an updated estimated position is generated every 100 milliseconds when the update rate is 10 Hz, 40 milliseconds when the update rate is 25 Hz, or every 20 milliseconds when the update rate is 50 Hz).

In some embodiments, the navigation apparatus reports an estimated position of the mobile object 110 to a home system, sometimes called an external system, external to the navigation apparatus. For example, a home system may be a server or a client system (e.g., a desktop, a laptop, a cell phone, a tablet, a personal digital assistant (PDA), etc.). In some embodiments, the home system is located in mobile object 110 (e.g., a user interface subsystem that presents maps and other information to a user of the mobile object) or is attached to mobile object 110. The home system is optionally linked to a network such as the Internet, and/or a local area network within mobile object 110. Optionally, the home system is configured to control movement of mobile object 110 (e.g., by controlling steering and/or propulsion systems of mobile object 110) so as maintain a predefined distance or relative position between mobile object 110 and a predefined position or another object, such as a second mobile object or a stationary object. In some embodiments, the navigation apparatus of mobile object 110 does not include a home system, while in some other embodiments, the navigation apparatus of mobile object 110 is in communication with the home system only intermittently. In some embodiments, navigation system 100 is configured to report updated estimated positions for the mobile object 110 at a rate that is less than or equal to the rate at which the updated estimated positions are generated. For example, the updated estimated positions may be generated at 10 Hz, but the navigation system 100 may report updated estimated positions at a rate of 0.5 Hz.

FIG. 2 is a block diagram illustrating a navigation apparatus 200 that is part of the navigation system 100 of FIG. 1, according to some embodiments. Navigation apparatus 200 typically includes one or more processors (CPU's) 202 for executing programs or instructions; one or more measurement receivers 204 for receiving measurements from one or more measurement sensors 118 (such as encoders, odometers, GNSS signal receiver for measuring quantized GNSS signal phases, etc.), although one or more of the measurement receivers 204 may be external to navigation apparatus 200 (e.g., coupled to navigation apparatus by a wired or wireless connection 211); optionally includes a satellite signal receiver 208 for receiving satellite navigation signals (e.g., if external to navigation apparatus, satellite signal receiver 208 is coupled by a wired connection 215, or to navigation apparatus 200); one or more communication interfaces 207; memory 210; and one or more communication buses 205 for interconnecting these components. Navigation apparatus 200 optionally includes a user interface 209 comprising a display device and one or more input devices (e.g., one or more of a keyboard, mouse, touch screen, keypad, etc.). In some embodiments, user interface 209 is a system or subsystem external to navigation apparatus 200, coupled to navigation system by a wired or wireless connection 219. The one or more communication buses 205 may include circuitry (sometimes called a chipset) that interconnects and controls communications between system components.

Communication interface 207 (e.g., a transmitter or transceiver, such as a radio transmitter or transceiver, or a wired communication transmitter or transceiver) is used by navigation apparatus 200 to receive communications, such as communications from a home system, as described above, or another system (internal or external to the mobile object 110, navigation apparatus 200, or navigation system 100) that is in communication with navigation apparatus 200. Communication interface 207, if included in navigation apparatus 200, is also used by navigation apparatus 200 to send signals from navigation apparatus 200 to a home system and/or report information corresponding to the position of mobile object 110. In some embodiments, communication interface 207 is a single transceiver, while in other embodiments, communication interface 207 includes separate transceivers or separate communication interfaces. In some embodiments, communication interface 207 is a wireless communication interface for connecting navigation apparatus 200 to a home system via the internet. In some embodiments, navigation apparatus 200 includes one or more additional receivers or communication interfaces for receiving or exchanging information with other systems, for example for receiving wide area differential global positioning system information.

In some embodiments, the one or more communication interfaces 207 of navigation apparatus 200 include a reporting apparatus 206 (e.g., a transmitter or transceiver, such as a radio transmitter or transceiver, or a wired communication transmitter or transceiver) that is used by navigation apparatus 200 to send information, such as information corresponding to the position of mobile object 110, from navigation apparatus 200 to one or more external systems 144. Examples of external systems that receive information from reporting apparatus 206 and that are embedded in or attached to mobile object 110 are a user interface subsystem (e.g., a user interface subsystem of mobile object 110 for displaying maps, such as presenting a map showing the location of the mobile object 110, and optionally provides other mapping and navigation functions to a user of mobile object 110), and a steering and/or propulsion system 144 of the mobile object. In some embodiments, an external system to which the reporting apparatus 206 sends information is external to the mobile object 110. In some embodiments, reporting apparatus 206 is a single transceiver, while in other embodiments, reporting apparatus 206 includes two or more separate transceivers or separate communication interfaces. In some embodiments, reporting apparatus 206 is or includes a wireless communication interface for connecting navigation apparatus 200 to one or more external systems 144 via the internet or other wide area network. In some embodiments, reporting apparatus 206, whether internal or external to navigation apparatus 200, is or includes a "user-level navigation system" that displays maps, shows the location of the mobile object 110 on a map, and provides other mapping and navigation functions to a user of mobile object 110.

Figure 3:
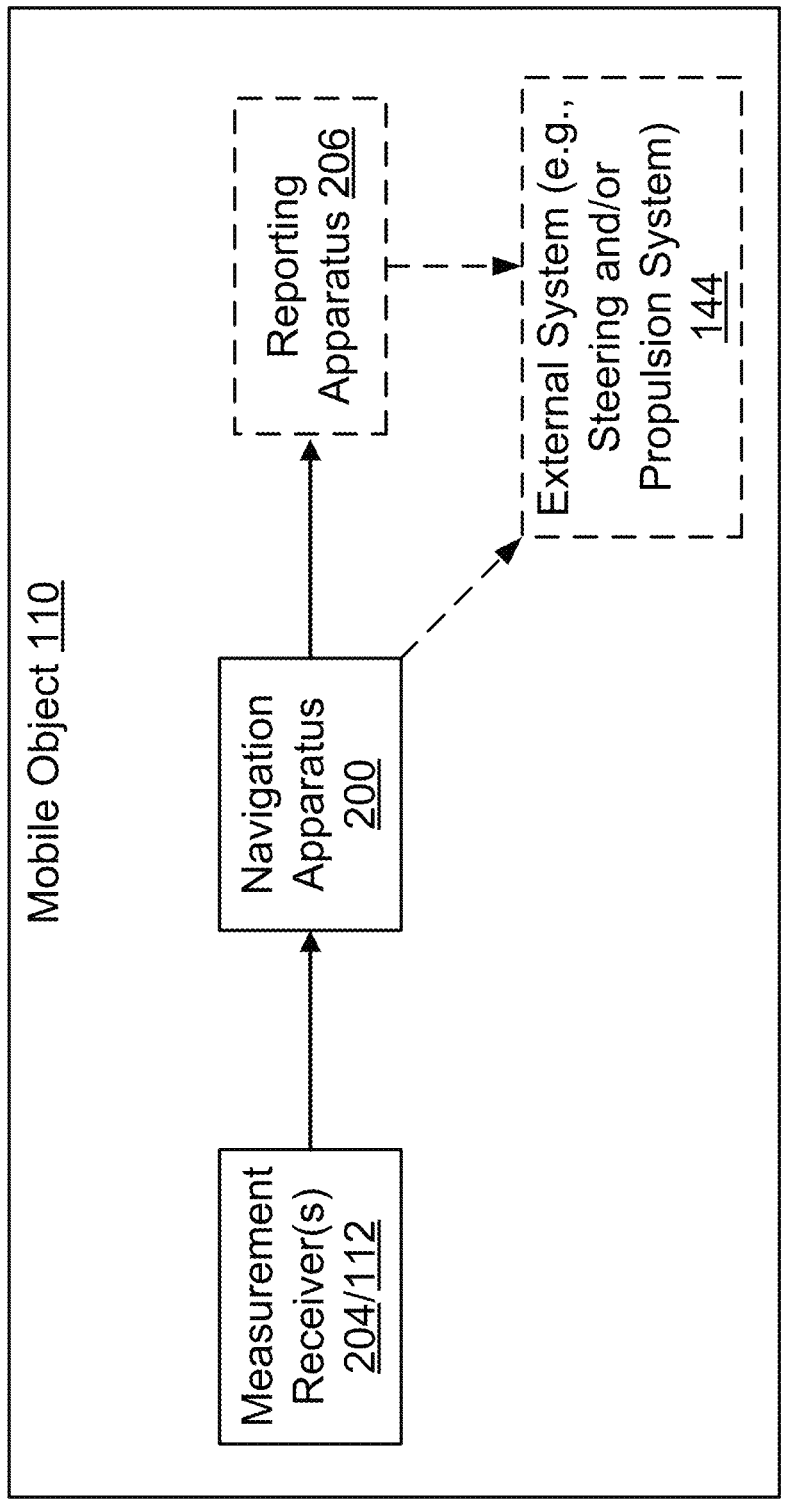
FIG. 3 is a block diagram illustrating a mobile object of FIG. 1, according to some embodiments.

In some embodiments, an example of which is shown in FIG. 3, reporting apparatus 206 is separate from the one or more communication interfaces 207, and is optionally external to navigation apparatus 200. In some such embodiments, reporting apparatus 206 receives information from navigation apparatus 200 via a respective communication interface of the one or more communication interfaces 207.

Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 optionally includes one or more storage devices remotely located from the CPU(s) 202. Memory 210, or alternately the non-volatile memory device(s) within memory 210, comprises a computer readable storage medium. In some embodiments, memory 210 or the computer readable storage medium of memory 210 stores the following programs, modules and data structures, or a subset thereof:

- An operating system 212 that includes procedures for handling various basic system services and for performing hardware dependent tasks.
- One or more communication modules 214 that operate in conjunction with the one or more communication interfaces 207 (e.g., one or more transceivers and/or communication ports) to handle communications between navigation apparatus 200 and other systems. In some embodiments, the communication modules 214 include drivers, which when executed by the one or more processors 202, enable various hardware modules in the one or more communication interface 207 to receive and/or send messages to external systems, external to the navigation apparatus 200.
- Data received from the one or more measurement receivers 216 (e.g., one or more sets of recently received data, optionally implemented as a local database), which includes data (e.g., data or information corresponding to one or more measurement sensors 118 such as an odometer or encoder) associated with the position or relative position (e.g., an encoder that counts the number of revolutions of a wheel, or an odometer) of mobile object 110. In some embodiments, one of the measurement receivers 216 receives information from a wheel encoder, which produces N "clicks" (e.g., 100 clicks) per revolution of a wheel of the mobile object's propulsion system, where each "click" corresponds to a change in the least significant bit (LSB) of the measurement conveyed by the encoder to the measurement receiver 216. In some embodiments, the data received by the one or more measurement receivers 216 is used by Kalman module(s) 222, as described in more detail below, to help determine the location of mobile object 110.
- Navigation application 218, which in some embodiments includes instructions that enable the navigation apparatus 200 perform navigation functions, such as to direct the mobile object 110 along a path (e.g., on a roadway, or in an agricultural field), or to maintain the mobile object 110 with a fixed attitude and distance relative to another mobile object.

Steering or propulsion control module 220 to steer or control propulsion of the mobile object 110.

One or more Kalman modules 222 (sometimes called navigation modules) that when executed by the CPU 202 determine a position of mobile object 110 or a relative position of mobile object 110 using satellite navigation data received from satellites (e.g., GPS or GNSS satellite) 114 by satellite receiver 208, and/or data received from measurement receiver(s) 112.

In some implementations, Kalman module(s) 222 include one or more GPS and/or other update module(s) 224 and a measurement update module 226, as described below.

In some embodiments, the one or more GPS and/or other update module(s) 224 processes received satellite navigation signals to determine satellite navigation data and estimated positions for mobile object 110 at a sequence of times, sometimes call epoch boundary times, and optionally at times between the epoch boundary times. This processing involves measuring or determining measurements of the received satellite navigation signals. For example, the measurements may include, for each satellite from which navigation signals are received, a pseudorange between the mobile object and the satellite, and phase measurements at one or more predefined frequencies, such as the L1 frequency, or the L1 and L2 frequencies. The one or more GPS and/or other update module(s) 224 use the satellite navigation signals and provide estimated positions of the mobile object 110 that are updated using a Kalman filter. The term Kalman filter herein means any of a wide range of Kalman filters, including not only convention Kalman filters, but also Extended Kalman filters, Unscented Kalman filters, and other estimation techniques (e.g., linear quadratic estimation techniques) that use a series of measurements observed over time, which may include statistical noise and other inaccuracies, and a recursive update process for making estimates of the current state of a system or object.

The measurement update module 226 processes the data received from measurement receiver(s) 112 to provide estimated positions for mobile object 110 at a sequence of times separated by time intervals. This processing involves receiving the measurements 216 (e.g., quantized measurements) from one or more measurement sensors 118, and the measurement update module 226 uses the received measurements 216 to provide estimated positions of the mobile object 110 that are updated using a Kalman filter. In some embodiments, the measurement update module 226 includes an error update module 228 (or set of instructions) and a covariance matrix update module 230 (or set of instructions). The measurement update module 226 models information regarding the mobile object 110, such as position, velocity, acceleration, and attitude (e.g., yaw, roll, pitch), as well as quantization error associated with the received measurements (e.g., an interval start quantization error value and an interval end quantization error value corresponding to quantization error values at the start and the end of an interval, respectively) as elements of an estimated state of the mobile object. In some embodiments, the estimated state may also include elements that correspond to sensor bias errors or sensor errors, representing persistent (or slowing varying) errors in received measurements or navigation signals.

As described above with reference to FIG. 1, in some embodiments, navigation system 200 updates the estimated state 232 of the mobile object 110 at two different but overlapping sequences of times, including, at a first sequence of times, based on quantized measurements from one or more measurement sensors 118, and at a second sequence of times, based on GPS, GNSS or other satellite signals received using a satellite receiver 208. For example, in some embodiments, updates (e.g., performed by measurement update module 226) to the estimated state based on received quantized measurements are performed at a first sequence of times, $$t_{start} + \Delta T_1 \times i, \text{for } i=0 \text{ to } i_{last}$$

while updates (e.g., using GPS or other update module 224 of navigation apparatus 200, FIG. 2) to the estimated state 232 based on satellite signals (e.g., GPS or GNSS signals) are performed at a second sequence of times, $$t_{start} + \Delta F + \Delta T_2 \times j, \text{for } j=0 \text{ to } j_{last}$$

where $t_{start}$ represents a start time, such as when the navigation apparatus 200 first begins generating and updating the estimated state, or alternatively represents any point in time during which the navigation apparatus is actively updating the estimated state; $\Delta T_1$ and $\Delta T_2$ are different nonzero time intervals, such as 0.1 second and 1 second, respectively, at which the estimated state is updated by the two update operations (e.g., one based on received quantized measurements and the other based received satellite signals, respectively); $\Delta F$ is a non-zero offset time, e.g., 0.01 or 0.05 seconds, to ensure the two sets of updates occur at different but overlapping sequences of times; and $i_{last}$ and $j_{last}$ corresponding to the last, or most recent, updates or iterations of the two sets of update operations.

In some embodiments, the error update module 228 updates (e.g., replaces) the interval start quantization error value in a starting state (e.g., a starting estimated state) for a current interval (e.g., a time interval corresponding to the $k^{th}$ iteration of a navigation update operation) with the interval end quantization error value of the most recent previous interval (e.g., the previous iteration, the $(k-1)^{th}$ iteration), since the end of one interval corresponds to (e.g., is the same as) a start of a next (e.g., succeeding or successive) interval. Details regarding updating an estimated state of the mobile object are described below with respect to FIG. 5D. The covariance matrix update module 230 updates (e.g., replaces) elements of a covariance matrix for a next interval (e.g., a time interval corresponding to the $(k+1)^{th}$ iteration of a navigation update operation). Details regarding the ways in which a covariance matrix is updated is described below with respect to FIG. 5E. The measurement update module 226 calculates an updated estimated state 232 and estimated covariance matrix 234, based on a most recently received measurement 216 (e.g., the last received measurement for the current interval or update iteration). In some embodiments, information corresponding to the estimated state 232 is reported to an external system via communication interface 207. For example, in some embodiments, information corresponding to the estimated state 232 is conveyed to a steering and/or propulsion system 144 via reporting apparatus 206.

Operating system 212 and each of the above identified modules and applications correspond to a set of instructions for performing a function described above. The set of instructions can be executed by the one or more processors 202 of navigation apparatus 200. The above identified modules, applications or programs (i.e., sets of instructions) need not be implemented as separate software programs, procedures or modules, and thus various subsets of these modules may be combined or otherwise re-arranged in various embodiments. In some embodiments, memory 210 stores a subset of the modules and data structures identified above. Furthermore, memory 210 optionally stores additional modules and data structures not described above.

FIG. 2 is intended more as functional description of the various features which may be present in a navigation apparatus 200 than as a structural schematic of the embodiments described herein. In practice, and as recognized by those of ordinary skill in the art, items shown separately could be combined and some items could be separated. For example, some items shown separately in FIG. 2 could be combined into a single module or component, and single items could be implemented using two or more modules or components. For example, the GPS and/or other update module(s) 224 and measurement update module 226 may be implemented by different computers, or by different processors, each processor having its own memory for storing programs for execution by that processor, that are part of navigation apparatus 200. The actual number of modules and components, and how features are allocated among them will vary from one implementation to another. In another set of examples, in some embodiments, one or more of the components or subsystems shown in FIG. 2 are external to the navigation apparatus 200. For example, in some embodiments, one or more of the measurement receivers 112 (204 in FIG. 2) are external to the navigation apparatus 200, coupled to navigation apparatus 200 by a wired or wireless connection 211; in some embodiments, the reporting apparatus 206 is external to the navigation apparatus 200, coupled to navigation apparatus 200 by a wired or wireless connection 217; and in some embodiments satellite receiver 208 is external to the navigation apparatus 200, coupled to navigation apparatus 200 by a wired connection 215.

FIG. 3 is a block diagram illustrating the mobile object 110 of FIG. 1 in some embodiments. In some embodiments, the one or more measurement receivers 112 and the navigation apparatus 200 are both part of (e.g., equipped by, embedded in, or attached to) mobile object 110. For example, measurement receiver(s) 112, such as a receiver for an encoder or odometer, and navigation apparatus 200 are mounted on a rover vehicle (sometimes herein called the mobile object, and illustrated as a tractor in FIG. 1). The mobile object 110 may also include any of reporting apparatus 206 and steering and/or propulsion system 144. For example, reporting apparatus 206 may be a communication device that is a part of mobile object 110 that facilitates communication between navigation apparatus 200 and steering and/or propulsion system 144. In some embodiments, reporting apparatus 206 and/or steering and/or propulsion system 144 may be external to mobile object 110 and in communication with navigation apparatus 200. Furthermore, in some embodiments, as shown in FIG. 2, one or more of the measurement receivers 112 (204 in FIG. 2) are part of the navigation apparatus 200, and in some embodiments, the reporting apparatus 206 is part of the navigation apparatus 200. However, in some other embodiments, one or more of the measurement receivers 112 (204 in FIG. 2) are external to the navigation apparatus 200, and in some embodiments, the reporting apparatus 206 is external to the navigation apparatus 200.

The measurement receiver(s) 112 receiver measurements (e.g., quantized measurements) from one or more measurement sensors 118 (e.g., encoder, odometer, or GNSS signal receiver for measuring quantized GNSS signal phases) and transmits the received information (e.g., the received measurement) to navigation apparatus 200. Navigation apparatus 200 determines an estimated state (e.g., estimated position, velocity, acceleration, attitude, etc.) of the mobile object 110 using the received information in a Kalman filter update operation, as described in more detail below. Optionally, the computed information from the estimated state (e.g., position, estimated velocity, etc.) is transmitted to steering and/or propulsion system 144, optionally via reporting apparatus 206. The steering and/or propulsion system 144, if provided, provides instructions to navigate and/or control movements of the mobile object 110. Alternatively, the computed information from the estimated state (e.g., position, estimated velocity, etc.) is provided to or transmitted to reporting apparatus 206, which may be internal or external to navigation apparatus 200.

Figure 4:
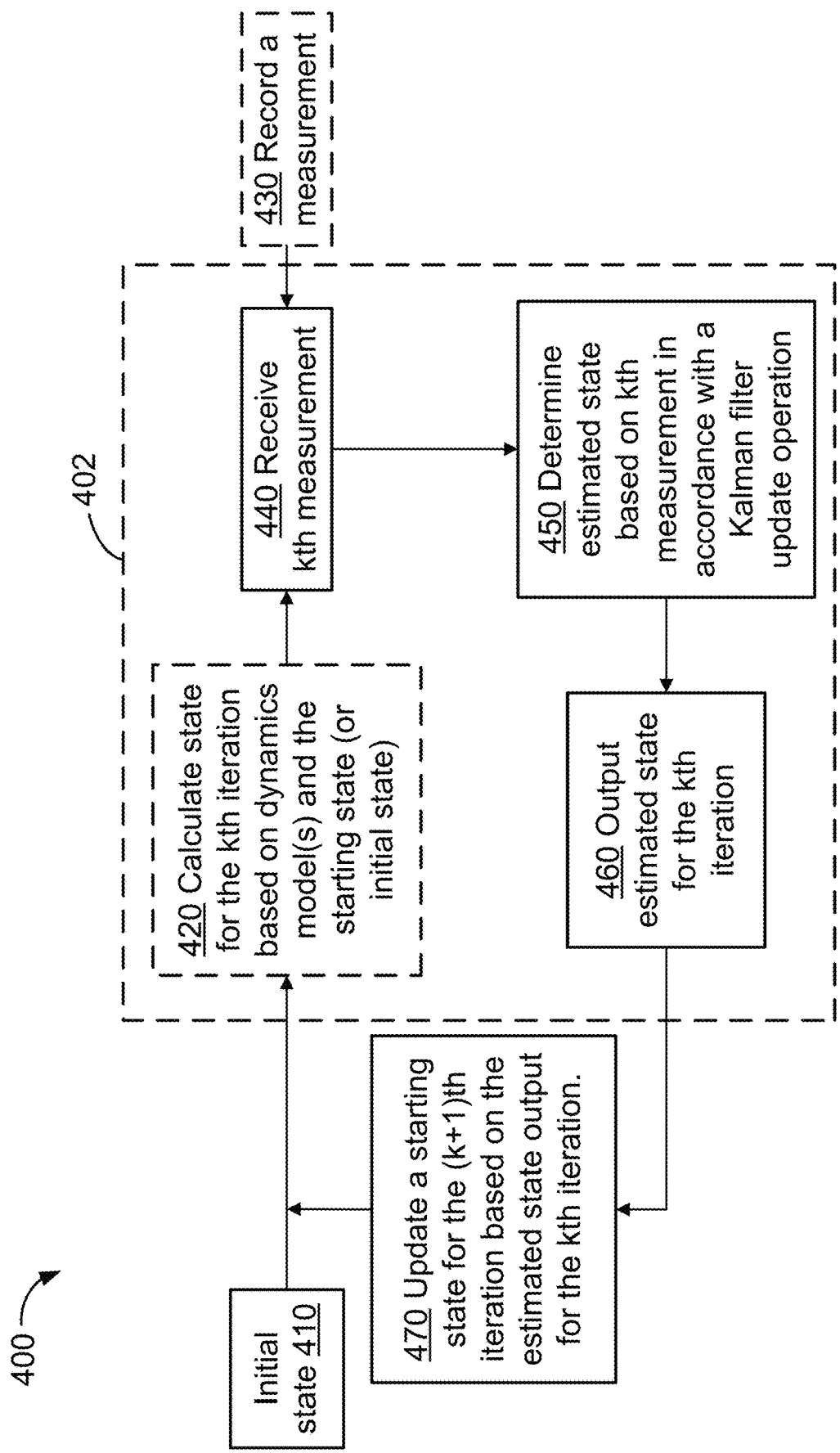
FIG. 4 is a flow diagram illustrating a process of updating a position of a mobile object using a Kalman filter, according to some embodiments.

FIG. 4 is a flow diagram illustrating a process 400 of updating an estimated state of a mobile object 110 using a Kalman filter update operation. When a measurement (such as a quantized measurement) is recorded, the navigation apparatus 200 updates an estimated state (e.g., position, velocity, attitude) of the mobile object 110 using measurement(s) 216 (e.g., data, information, quantized measurements) received from one or more measurement receivers 112. In some embodiments, the estimated state of the mobile object 110 is updated in response to receiving a measurement 216 or is updated for each received measurement 216. Portions of process 400 that correspond to iterative updating of the estimated state of the mobile object 110 are shown in a dashed box 402 in FIG. 4.

At the beginning of process 400, (operation 410) navigation information (e.g., position, velocity, acceleration, attitude) for the mobile object 110 is represented by an initial state. For example, the initial state may show an initial (e.g., starting) position (e.g., x, y, z representing a recently determined position for the mobile object, or a last determined position for the mobile object) for the mobile object 110 as well as any of an initial velocity, an initial acceleration, and/or an initial attitude (e.g., pitch, heading, roll). In some embodiments, process 400 optionally includes (operation 420) calculating a current state (e.g., a state for the $k^{th}$ iteration) for the mobile object using one or more dynamics models (e.g., physics models, kinematic equations, etc.). In the first iteration, navigation information from the initial state (from operation 410) is used in the calculations of operation 420. In iterations succeeding the first iteration, a starting state from a previous (e.g., most recent) iteration is used in the calculations of operation 420. In some embodiments, as shown in FIG. 4, calculating a state using dynamics model(s) (e.g., operation 420) is performed prior to (operation 440) receiving the measurement 216. Alternatively, (operation 420) calculating a state using dynamics model(s) may be performed concurrently with or after (operation 440) receiving the measurement 216.

Updating the estimated state of the mobile object 110 typically begins after a measurement 216 is received (operation 440) at the one or more measurement receivers 112. Prior to being received, the measurement is optionally recorded (operation 430), e.g., by sensor 118 or other device external to navigation apparatus 200. After receiving (operation 440) the measurement, and optionally computing (operation 420) a state using dynamics model(s), process 400 includes updating operation (450) the state of the mobile object 110 based on the received measurement 216 using a Kalman filter update operation.

In some embodiments, operations 420-460 are performed at a predefined rate, whether or not any new measurements are recorded and received. That predefined rate is typically in the range of 1000 times per second to 1 time per second, inclusive, with 10 times per second (at 0.1 second intervals)

being a typical example. Optionally, in some embodiments, if no new measurements are received during the current time period (e.g., because the mobile object didn't move during that time interval, or the amount of movement detected by the sensor or encoder was less than a predefined minimum quantized distance (e.g., corresponding to a single bit change in value of the quantized measurement)), the recording, receiving and estimated state determination operations 430, 440 and 450 are skipped. But in some other embodiments, if the state determined (operation 420) using dynamics models causes any change in the state of the mobile object, then estimated state determination operation 450 is performed even if no new measurements are received during the current time interval.

In some embodiments, in Kalman filter update operation (operation 450), an estimated state is updated based on equation (1), below.

$$x_k^+ = x_k^- + K_k(z_k - f(x_k^-)) \quad (1)$$

In equation (1), $x_k^-$ is the estimated state (such as estimated state 510, described below with respect to FIG. 5A) for a mobile object 110, $x_k^+$ is an updated estimated state for the mobile object generated by the Kalman filter update operation, $f(x_k^-)$ is the estimated value of the measurement, based on the current estimated state $x_k^-$ for the mobile object 110, that is calculated using dynamics models (e.g., calculated in operation 420), $K_k$ is the Kalman gain, sometimes called the Kalman gain function, such as Kalman gain function 530, described below with respect to FIG. 5B), $z_k$ is the measurement (e.g., quantized measurement) received at operation 440, and the subscript k refers to a current time or computational iteration (e.g., in equation (1), the $k^{th}$ iteration typically represents the current iteration). The Kalman gain can generally be thought of as function that determines how much weight to give the estimated value of the measurement, based on the current estimated state $x_k^-$ (as calculated using dynamics models in operation 420) versus the received measurement $z_k$ (as recorded in operation 430 and received in operation 440) in the calculation to determine the estimated state of the mobile object 110. Additional details regarding the update operation 450 are provided below with respect to FIGS. 5A-5C, including details regarding the estimated state (described with respect to FIG. 5A) and the Kalman gain equation (described with respect to FIGS. 5B and 5C).

The estimated state of the navigation apparatus or mobile object for the current time, produced by the current iteration (e.g., $k^{th}$ iteration) of the estimated state update process, is output in operation 460 and used in operation 470 to update a starting state for the next iteration (e.g., the $(k+1)^{th}$ iteration) of operations 420-450. Operation 470 occurs after the Kalman filter update process (e.g., operation 450) of the current iteration and before the Kalman filter update process (e.g., operation 450) of the next iteration. In other words, operation 470 is performed in between operation 450 of successive iterations. While operation 470 is shown in FIG. 4 as being performed after output operation 460 for a $k^{th}$ iteration and before operation 420 for a $(k+1)^{th}$ iteration, in other embodiments operation 470 may be performed after operation 420 and before operation 450. Additional details regarding operation 470 is described below with respect to FIGS. 5D and 5E.

In some embodiments, the estimated state for mobile object 110 that is generated (e.g., calculated, updated) in operation 450 is reported to a reporting apparatus 206 and/or steering and/or propulsion system 144.

Process 400, as described above, can be repeated for any number of times (e.g., iterations) so as to update the estimated state of the mobile object 110 over time. In some embodiments, the number of iterations or the length of time that the process 400 is repeated for is predetermined.

Figure 5A:
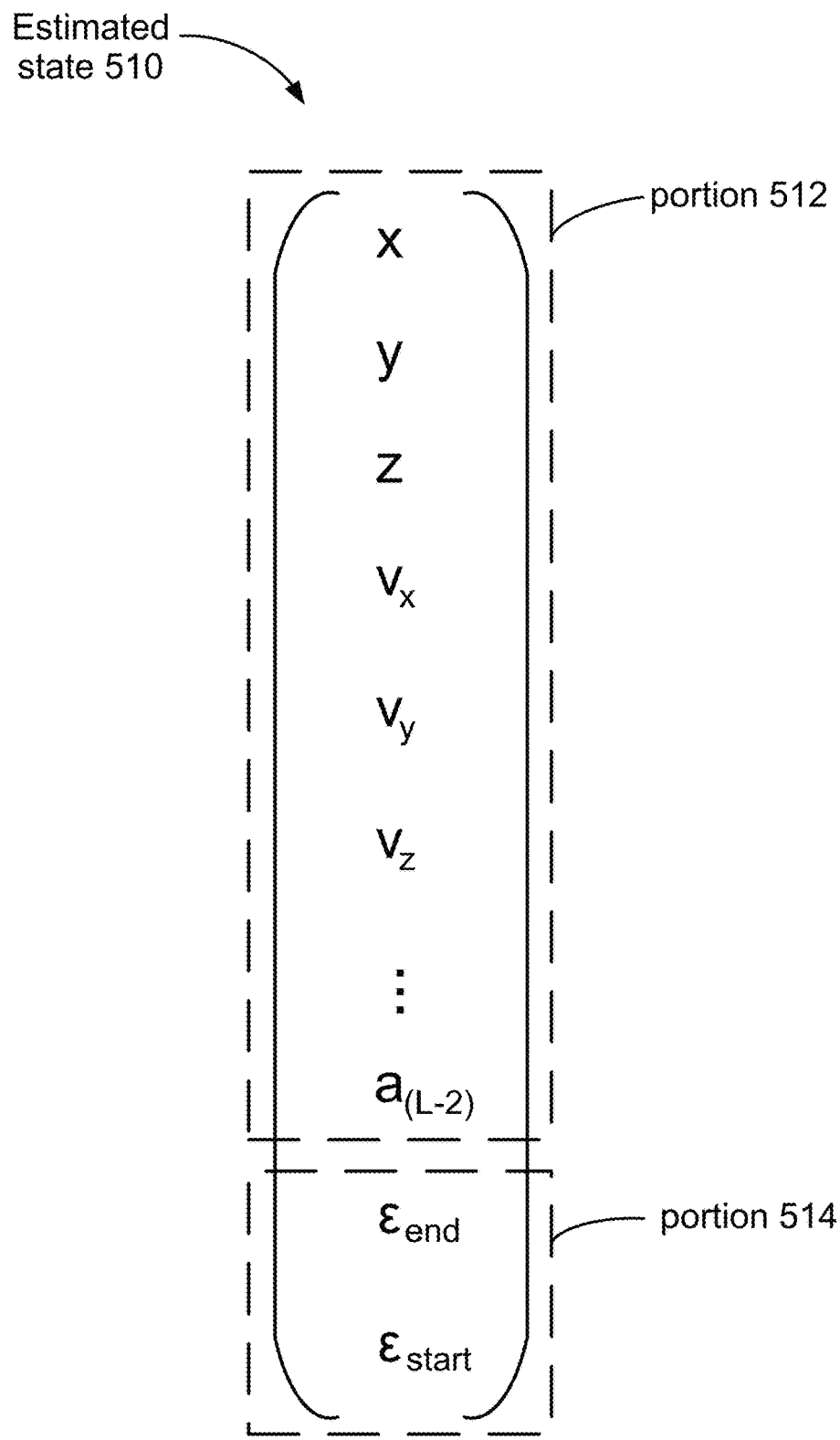
FIG. 5A is an example of a data structure for the estimated state of a mobile object, according to some embodiments.

FIG. 5A is an example of an estimated state 510 (e.g., corresponding to estimated state 232 in FIG. 2, and $x_k$ in equation (1)) for a mobile object 110, according to some embodiments. Estimated state 510 is determined (e.g., generated, calculated, computed) based on received measurements (e.g., received measurements 216) that are quantized measurements. Estimated state 510 is a 1 by L (also designed 1×L) matrix that includes L elements. Each element is represented as $a_i$, for i=1 to L, with i being (or indicating) the row of the 1×L matrix that contains that element. For example, the first element of estimated state 510 is $a_1$, the second element is $a_2$, and so on and so forth. Estimated state 510 includes a first portion 512 and a second portion 514. The first portion 512 of estimated state 510 includes L−2 of elements. Elements in the first portion 512 of estimated state 510 correspond to position-related attributes of the mobile object 110. For example, in some embodiments, each of the first, second, and third elements $a_1$, $a_2$, and as corresponds to a position of mobile object 110 along the x, y, and z directions, respectively. Each of the fourth, fifth, and sixth elements $a_4$, $a_5$, and $a_6$ corresponds to a velocity of mobile object 110 along the x, y, and z directions, respectively. The first portion 512 of estimated state 510 may also include other elements corresponding to various other position-related attributes of mobile object 110, such as attitude (pitch, heading, roll) (sometimes called the direction of movement or direction of motion) and acceleration. In some embodiments, the first portion 512 of estimated state 510 may also include one or more elements that correspond to sensor bias errors or sensor errors, representing persistent (or slowing varying) errors in received measurements or navigation signals.

The second portion 514 of estimated state 510 includes two elements $a_{(L-1)}$, and $a_L$. Elements of the second portion 514 of estimated state 510 correspond to an interval end quantization error value, $\varepsilon_{end}$ (e.g., the quantization error value at the end of an interval), and an interval start quantization error value, $\varepsilon_{start}$ (e.g., the quantization error value at the start of an interval). It is understood that the elements of estimated state 510, as described above, may be arranged in any order and need not follow the order shown in FIG. 5A.

Figure 5B:
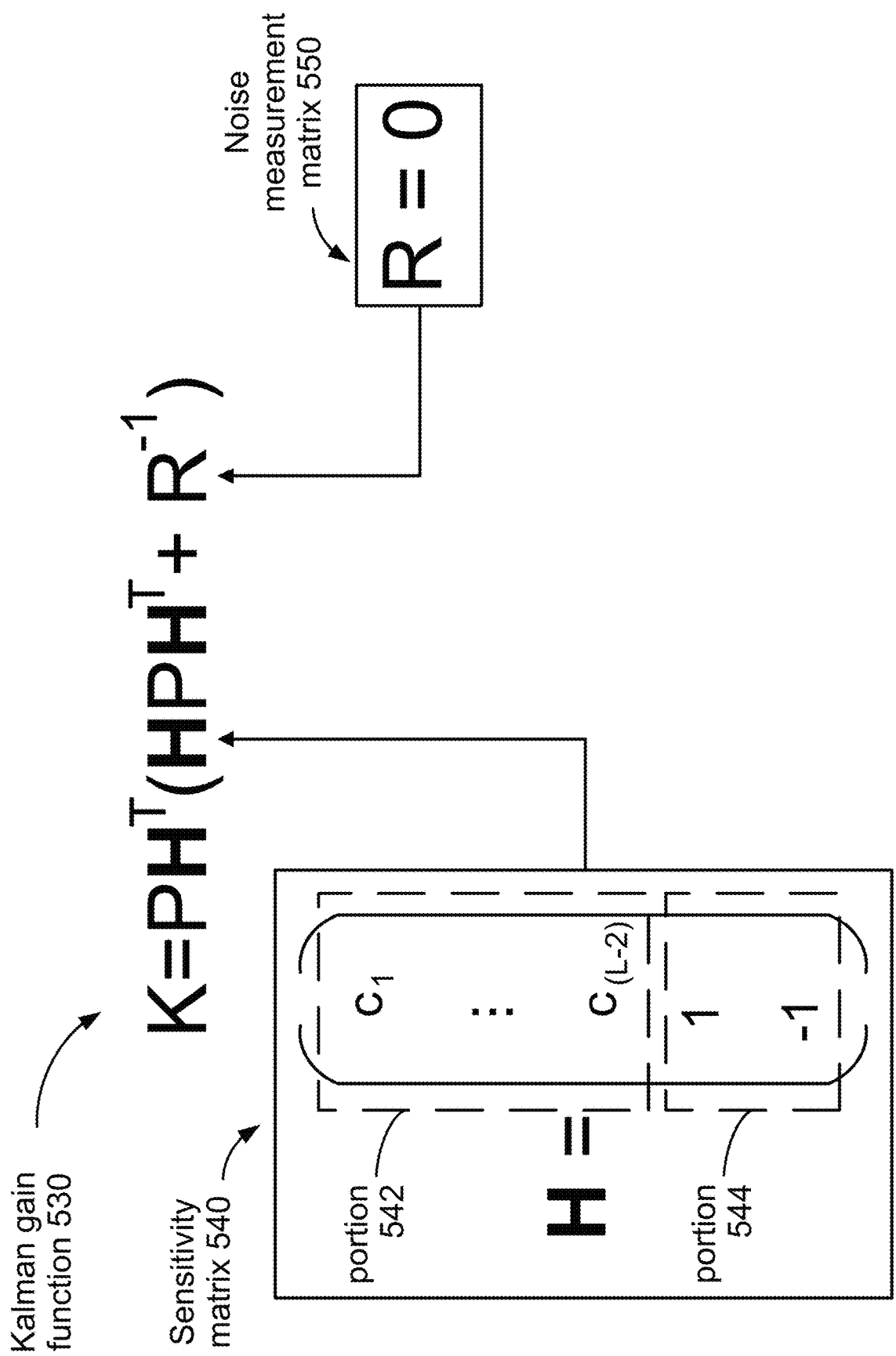
FIG. 5B is an example of a Kalman gain function, according to some embodiments.

FIG. 5B is an example of a Kalman gain function 530 (e.g., $K_k$ in equation (1)), sometimes called a Kalman gain, used in the Kalman filter update operation (e.g., operation 450 in FIG. 4) to update the estimated state 510 (shown in FIG. 5A). Kalman gain function 530 includes covariance matrix 520 (represented by P and described below with respect to FIG. 5C), a sensitivity matrix 540 (represented by H in FIG. 5B), and a noise measurement matrix 550 (represented by R in FIG. 5B). The sensitivity matrix 540 is a model of how the received measurement (e.g., measurement 216, quantized measurement, $z_k$ in equation (1)) affects the current state (e.g., $x_k^-$ in equation (1)). The noise measurement matrix 550 is a model of the known or expected noise in a measurement technique used to acquire (e.g., record, capture) the measurement (e.g., measurement 216, quantized measurement, $z_k$ in equation (1)).

The sensitivity matrix 540 (H), sometimes referred to as the design matrix, is a 1 by L matrix that includes a same number of elements as a corresponding estimated state 510, and similarly includes a first portion 542 corresponding to the first portion 512 of the estimated state 510 and a second portion 544 corresponding to the second portion 514 of estimated state 510. The elements of sensitivity matrix 540 are represented as $c_i$ with i being (or indicating) the row of matrix 540 of each element. In the first portion of sensitive matrix 540, elements $c_1$ to $c_{(L-2)}$, inclusive, correspond to the effect of the received measurement (e.g., measurement 216, quantized measurement, $z_k$ in equation (1)) on the current state (e.g., $x_k^-$ in equation (1)).

Furthermore, second portion 544 of sensitivity matrix 540 includes an element, e.g., $c_{(L-1)}$, that represents an interval end quantization error sensitivity value and corresponds to the interval end quantization error value, $\varepsilon_{end}$, in the estimated state 510, and includes another element, e.g., $c_L$, that represents an interval start quantization error sensitivity value and corresponds to the interval start quantization error value, $\varepsilon_{start}$, of the estimated state, and those two elements, sometimes called quantization error sensitivity value elements, are in positions of the sensitivity matrix 540 that correspond to the positions of the corresponding quantization error values in the estimated state 510. In the example shown in FIGS. 5A-5B, the interval end quantization error value, $\varepsilon_{end}$, in the estimated state 510, and the corresponding interval end quantization error sensitivity value are the $(L-1)^{th}$ element of both matrices, and the interval start quantization error value, $\varepsilon_{start}$, in the estimated state 510, and the corresponding interval start quantization error sensitivity value are the $L^{th}$ element of both matrices.

In some embodiments, such as embodiments in which successive received measurements (e.g., other than the first received measurement) are quantized measurements, in a sequence of received quantized measurements, that each have a negative correlation to at least a prior measurement (e.g., a preceding measurement, a closest prior measurement) in the sequence of received quantized measurements, the interval end quantization error sensitivity value and the interval start quantization error sensitivity value are equal in magnitude and opposite in sign (e.g., equal to 1 and −1, respectively), representing (e.g., reflective of, indicating) that the measurement for a respective interval is formed from the quantized value at the end of the interval minus the quantized value at the start of the interval.

The noise measurement matrix 550 is a model of measurement noise in the measurement technique used to obtain the measurements (e.g., measurements 216, quantized measurement, $z_k$ in equation (1)) used in the Kalman filter update. Thus, the noise measurement matrix 550 will differ for different measurement types or different measurement mechanisms. For example, a noise measurement matrix for a measurement corresponding to GPS signals will be different from a noise measurement matrix for a measurement corresponding to encoder readings from a wheel encoder. In another example, noise measurement matrices corresponding to GPS signals, odometer readings, and radar signals will differ from one another.

In some embodiments, such as when modeling the state (e.g., position, velocity, attitude, etc.) of a mobile object 110 based on quantized measurements and using estimated state 510 as described with respect to FIG. 5A), the measurement error of the quantized measurements, including any non-quantization errors associated with the measurement, is modeled by the quantization error in estimated state 510 and its corresponding covariance matrix elements. In such cases, the remaining measurement noise (in the measurement technique used to obtain the quantized measurements) is zero and therefore the noise measurement matrix 550 is zero.

Figure 5C:
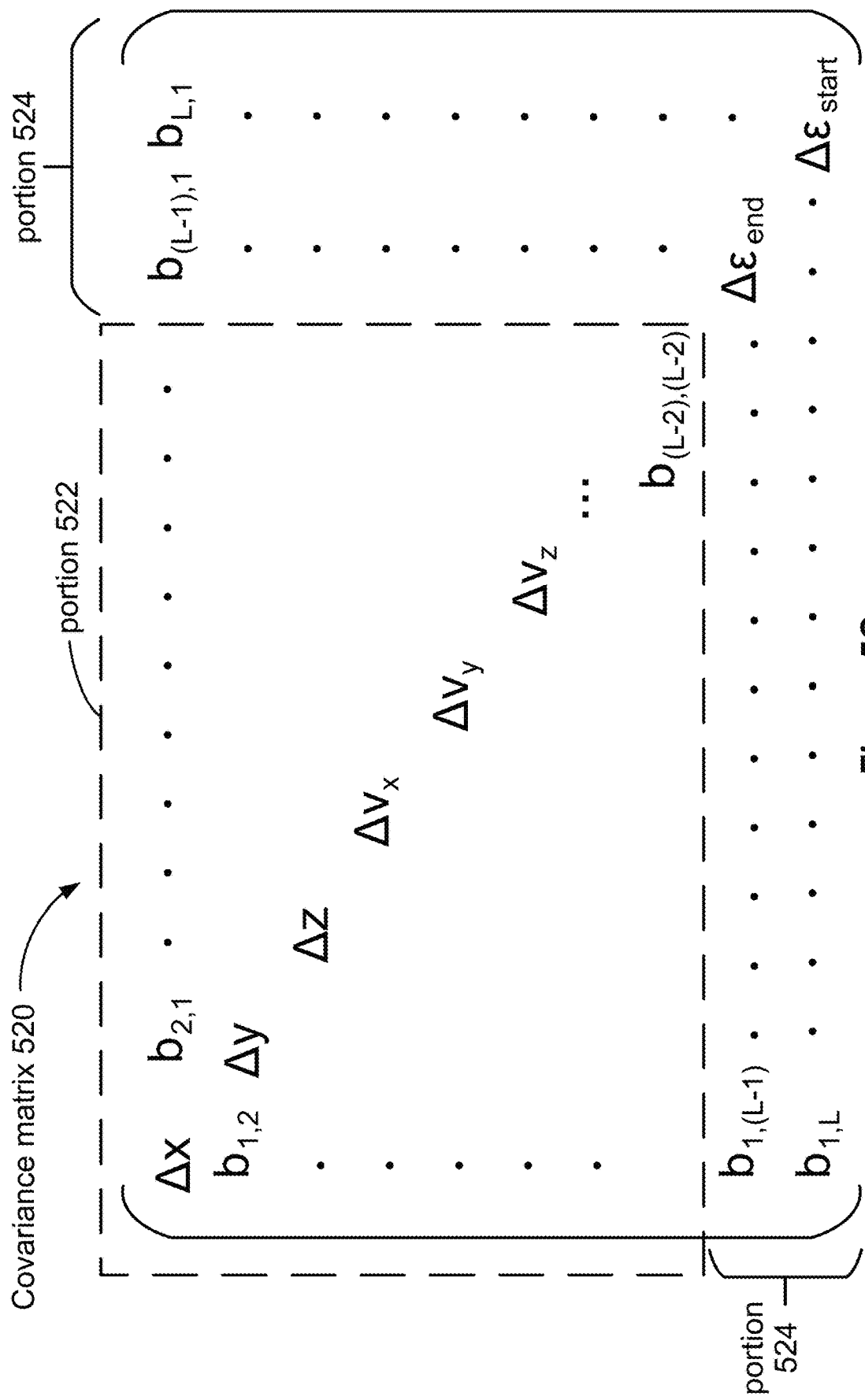
FIG. 5C is an example of a covariance matrix corresponding to the Kalman gain function of FIG. 5B, according to some embodiments.

An example of the covariance matrix 520 (e.g., covariance matrix P in FIG. 5B) of Kalman gain function 530 is shown in FIG. 5C. Covariance matrix 520 is an L by L matrix that includes $L^2$ elements (e.g., the number of elements of covariance matrix is equal to $L^2$). Each element is represented as $b_{m,n}$, with m being (or indicating) the row of the element and n being (or indicating) the column of the element. The diagonal elements of covariance matrix 520 represent squared values. Covariance matrix 520 includes a first portion 522 and a second portion 524. The first portion 522 of covariance matrix 520 includes $(L-2)^2$ elements. Elements in the first portion 522 of covariance matrix 520 correspond to elements in the first portion 512 of estimated state 510 (e.g., elements that represent position-related attributes of mobile object 110). Elements in the second portion 524 of covariance matrix 520 correspond to elements in the second portion 514 of estimated state 510 (e.g., elements that represent quantization errors at the start and end of an interval). In the example shown in FIG. 5C, the second portion 524 of covariance matrix 520 includes the last two rows (also herein called the last and second to last rows) and the last two columns (also herein called the last and second to last columns) of covariance matrix 520 in the example shown in FIG. 5C, and more generally includes two rows and two columns corresponding to the elements in the second portion of the estimated state 510.

In some embodiments, a figure of merit for an attribute (e.g., a position-related attribute) of the mobile object can be calculated based on one or more diagonal elements of covariance matrix 520, and provided (e.g., reported) along with at least a portion of the estimated state of the mobile object 110, to a reporting apparatus (e.g., a device or system external to navigation apparatus 200). Optionally, the figure of merit for an attribute of the mobile object can be calculated based on one or more diagonal elements of covariance matrix 520 as well as one or more off-diagonal elements of covariance matrix 520. Providing a figure of merit to the reporting apparatus enables the reporting apparatus to determine the level of precision that should be accorded to the estimated state, or to the portion of the estimated state (e.g., position) that corresponds to the figure of merit. For example, if the figure of merit indicates that the reported position is likely accurate with a first margin (or range) of error (e.g., plus or minus 1 meter), the position may be represented by the reporting apparatus to a user or other system in a manner commensurate with a first margin (or range) of error, and if the figure of merit indicates that the reported position is likely accurate with a second margin (or range) of error (e.g., plus or minus 10 meters), different from the fist margin of error, the position may be represented by the reporting apparatus to a user or other system in a manner commensurate with the second margin (or range) of error, different from the manner commensurate with the first margin (or range) of error (e.g., by representing the current position differently (e.g., with a larger circle or object representation in a displayed map, or with fewer non-zero digits) than when representing the position in the manner commensurate with the first margin (or range) of error.

As noted above, the diagonal elements of covariance matrix 520 represent squared values. In some embodiments, a figure of merit corresponding to a position of mobile object 110 corresponds to the square root of the sum of the diagonal elements corresponding to the position elements of the estimated state. For example, element $b_{1,1}$ may correspond to variance in the calculated position of mobile object 110 along the x-direction (e.g., $\sqrt{b_{1,1}}$ or $\sqrt{\Delta x}$ corresponds to variance in $a_1$), element $b_{2,2}$ may correspond to variance in the calculated position of mobile object 110 along the y-direction (e.g., $\sqrt{b_{2,2}}$ or $\sqrt{\Delta y}$ corresponds to variance in $a_2$), element $b_{3,3}$ may correspond to variance in the calculated position of mobile object 110 along the z-direction (e.g. $\sqrt{b_{3,3}}$ or $\sqrt{\Delta z}$ corresponds to variance in $a_3$), and so on and so forth. Thus, a figure of merit (FOM) corresponding to a position (in x, y, z) of mobile object 110 may be determined as follows: FOM=$\sqrt{b_{1,1}+b_{2,2}+b_{3,3}}$. Thus, the figure of merit for an estimated three dimensional position is similar to a "standard deviation" for the three dimensional position, where the "standard deviation" quantifies the extent to which the estimated position is lacking in reliability.

Two diagonal elements (e.g., the last two elements) of covariance matrix 520 correspond to variance in the interval end quantization error value, $\Delta \varepsilon_{end}$, and variance in the interval start quantization error value, $\Delta \varepsilon_{start}$. For example, when the quantization error of an interval is a random error that is assumed to have a normal distribution, the variance in the interval end quantization error value, $\Delta \varepsilon_{end}$, has a value of $(LSB^2)/12$, where LSB is the distance (or other unit of measure) corresponding to the least significant bit in the measurement (e.g., the smallest possible non-zero difference in value (e.g., distance) between any two measurement values). The elements of covariance matrix 520 are determined based on the elements of estimated state 510. Thus, if the elements of an estimated state were to differ (either having different elements, or elements being presented in a different order) from estimated state 510, the corresponding covariance matrix would differ accordingly from covariance matrix 520 shown in FIG. 5C.

After the estimated state 510 is generated (e.g., computed, output) for a current time (e.g., $k^{th}$ iteration of the Kalman filter update operation), and before the next Kalman filter update operation (e.g., operation 450 for the $(k+1)^{th}$ iteration) begins, a starting state 560 and a updated Kalman gain is determined for the next iteration (e.g., the $(k+1)^{th}$ iteration). The starting state 560 for the next iteration (e.g., the $(k+1)^{th}$ iteration) is determined (e.g., updated) based on the estimated state 510 determined during the current iteration. The Kalman gain for the next iteration (e.g., the $(k+1)^{th}$ iteration) is updated by updating the covariance matrix in the Kalman gain function.

Figure 5D:
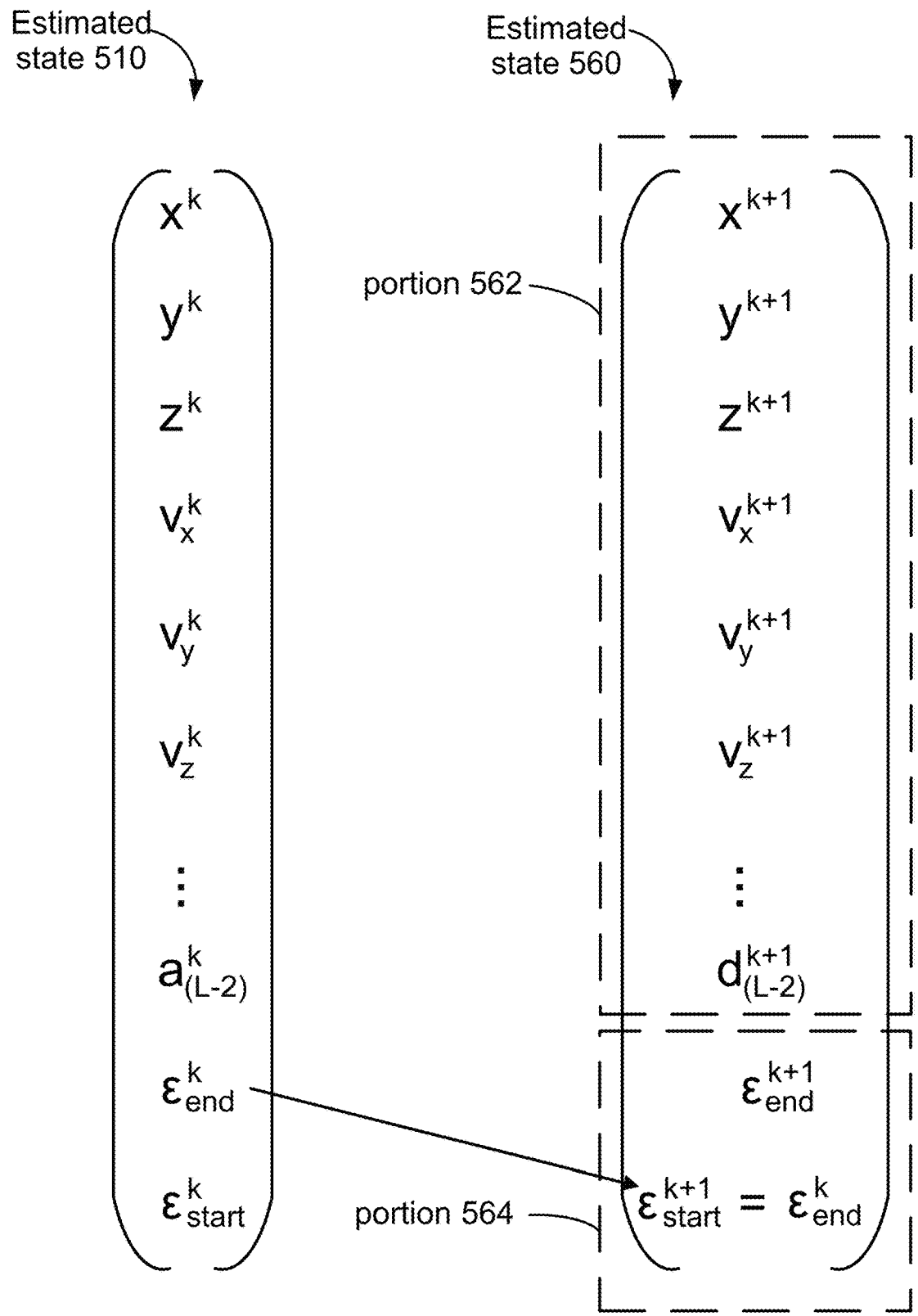
FIG. 5D is an example of a starting estimated state for a mobile object, according to some embodiments.
Figure 6B:
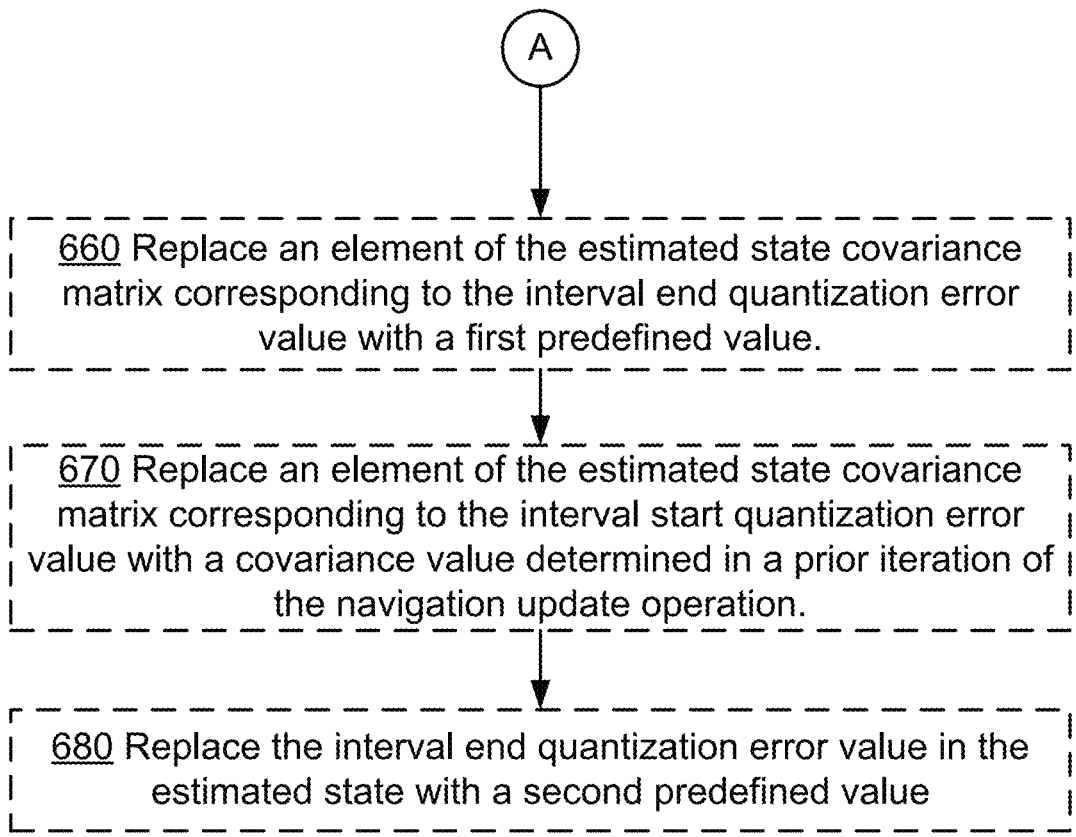
Figure 6D:
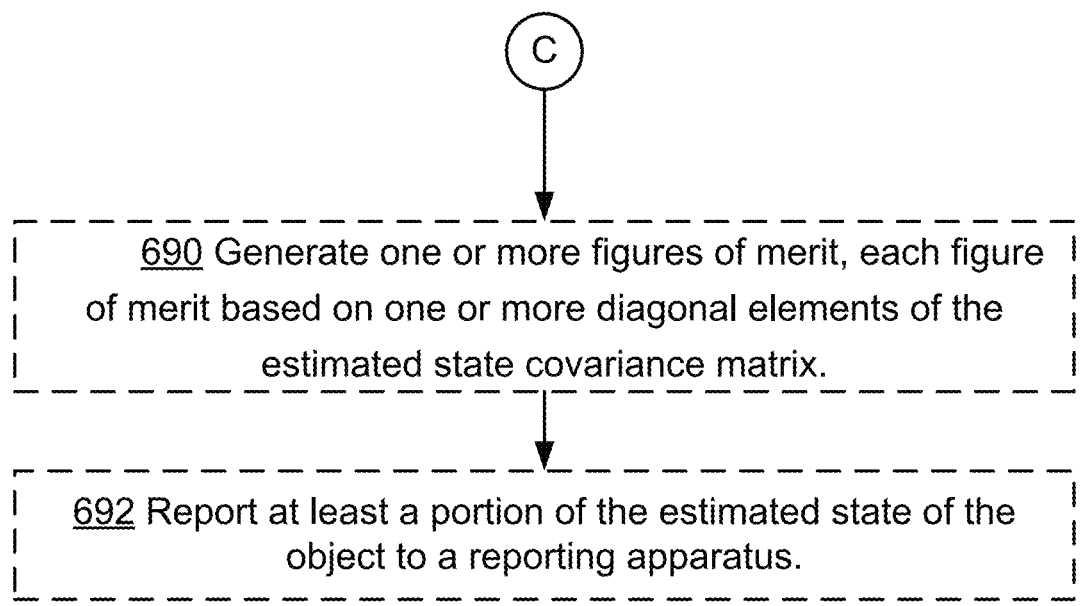

FIG. 5D illustrates how starting state 560 (e.g., a starting state for the $(k+1)^{th}$ iteration) is determined (e.g., updated) based on estimated state 510 (e.g., an estimated state that is generated using a Kalman filter update operation in the $k^{th}$ iteration). The process of determining starting state 560 corresponds to operation 470 of FIG. 4. The elements in estimated state 510 are notated with the superscript k to indicate that the elements of estimated state 510 correspond to (e.g., is calculated as part of, is generated in) the $k^{th}$ iteration. Similarly, elements in starting state 560, represented as $d_i$ (with i being or indicating the row of the element), are notated with the superscript k+1 to indicate that the elements of starting state 560 correspond to (e.g., are used in) the $(k+1)^{th}$ iteration. Similarly to estimated state 510, starting state 560 includes a first portion 562 and a second portion 564. The first portion 562 of starting state 560 includes L−2 elements and elements in the first portion 562 of starting state 560 correspond to position-related attributes of the mobile object 110 in the $(k+1)^{th}$ iteration. The second portion 564 of starting state 560 includes two elements, $d_{(L-1)}^{k+1}$, and $d_L^{k+1}$. The elements of the second portion 562 of starting state 560 correspond to the interval end quantization error value, $\varepsilon_{end}^{k+1}$, and the interval start quantization error value, $\varepsilon_{start}^{k+1}$, for the $(k+1)^{th}$ interval (e.g., $(k+1)^{th}$ iteration).

Since the end of the $k^{th}$ interval corresponds to (occurs at the same time as) the start of the $(k+1)^{th}$ interval, the interval start quantization error value for the $(k+1)^{th}$ interval is the same as the interval end quantization error value for the $k^{th}$ interval. Thus, the interval start quantization error value for the $(k+1)^{th}$ interval, $\varepsilon_{start}^{k+1}$, is updated to have the same value as (e.g., is replaced with) the interval end quantization error value from the $k^{th}$ interval, $\varepsilon_{end}^k$ (e.g., $\varepsilon_{start}^{k+1}=\varepsilon_{end}^k$, or equivalently, $\varepsilon_{end}^k \to \varepsilon_{start}^{k+1}$).

In some embodiments, the interval start quantization error value for the $(k_{+1})^{th}$ interval, $\varepsilon_{start}^{k+1}$, is updated (e.g., replaced) with a predefined value. In some embodiments, the predefined value is zero. Once any updates (e.g., replacements) to the elements of the starting state 560 have been made based on the estimated state 510, determined during the previous iteration (e.g., the $k^{th}$ iteration) of the update process, the starting state 560 can be used in the Kalman filter update operation of the next (e.g., succeeding) iteration (e.g., starting state 560 is used as an input for equation (1) in the $(k+1)^{th}$ iteration and will result in a new estimated state being determined based on the starting state 560 and a new received measurement).

FIG. 5E shows an updated covariance matrix 570 for a Kalman gain (e.g., Kalman gain function 530) used in the next iteration (e.g., $(k+1)^{th}$ iteration) of the Kalman filter update process. The updated covariance matrix 570 is determined, e.g., during operation 470 (FIG. 4), based on the covariance matrix 520 generated in the Kalman filter update process for the current iteration (e.g., the $k^{th}$ iteration). The elements in updated covariance matrix 570 are represented as $e_{m,n}$ with m being or indicating the row of the element and n being or indicating the column of the element in the updated covariance matrix 570. Similarly to covariance matrix 520, updated covariance matrix 570 includes a first portion 572 and a second portion 574. The first portion 572 of updated covariance matrix 570 includes $(L-2)^2$ elements, and elements in the first portion 572 of updated covariance matrix 570 correspond to elements in the first portion 562 of the starting state 560. The second portion 574 of updated covariance matrix 570 includes the last two rows (also herein called the last and second to last rows) and last two columns (also herein called the last and second last columns) of updated covariance matrix 570, and elements in the second portion 574 of updated covariance matrix 570 correspond to elements in the second portion 564 of the starting state 560.

The elements of updated covariance matrix 570 are determined by a similarity transformation, shown in equation (2), below.

$$P_{k+1}=AP_kA^T \qquad (2)$$

In equation (2), the covariance matrix 520 is represented as $P_k$, notated with the subscript k to indicate that the covariance matrix 520 corresponds to (e.g., is part of) the Kalman gain function 530 used in the Kalman filter update operation of the $k^{th}$ iteration. The updated covariance matrix 570 is represented as $P_{k+1}$, notated with the subscript k+1 to indicate that the updated covariance matrix 570 corresponds to (e.g., is part of) the Kalman gain function 530 used in the Kalman filter update operation of the $(k+1)^{th}$ iteration. The transformation matrix A has the same dimensions (and therefore a same number of elements) as covariance matrix 520 and updated covariance matrix 570. For example, when an estimated state has 4 elements (e.g., position, velocity, interval end quantization error value, and interval start quantization error value), the corresponding covariance matrix (e.g., the covariance matrix used in the Kalman gain equation), and therefore the transformation matrix A, are 4×4 matrices. In such an example, the transformation matrix A looks like:

$$\begin{bmatrix} 1 & 0 & 0 & 0 \\ 0 & 1 & 0 & 0 \\ 0 & 0 & 0 & 0 \\ 0 & 0 & 1 & 0 \end{bmatrix}.$$

In some embodiments, the transformation of the covariance matrix from the $k^{th}$ iteration to the $(k+1)^{th}$ iteration includes additional terms that define the transition of the state vector with the passage of time. This transformation matrix only considers the update associated with changes in received measurements.

The similarity transformation shown in equation (2) (e.g., operation 470 in FIG. 4) is performed between two consecutive Kalman filter update operations (e.g., operation 450 of two consecutive iterations). The similarity transformation updates the covariance matrix of Kalman gain function 530, and therefore updates the Kalman gain function 530, for use in a next iteration (e.g., Kalman gain function 530, which includes covariance matrix 520, is used in equation (1) during the $k^{th}$ iteration, and an updated Kalman gain function 530 that includes updated covariance matrix 570 is used in equation (1) during the $(k+1)^{th}$ iteration).

After applying the similarity transformation shown in equation (2), the updated covariance matrix 570 (e.g., updated covariance matrix $P_{k+1}$) has the following features:

Elements in the second to last row $e_{(L-1),n}$ of updated covariance matrix 570 and the elements in the second to last column $e_{m,(L-1)}$ of updated covariance matrix 570 are equal to zero.

Elements in the last column $e_{L,n}$ of updated covariance matrix 570 are equal to the elements in the second to last column of covariance matrix 520, with the exception of element $e_{L,(L-1)}$ being zero, as previously mentioned.

Elements in the last row $e_{m,L}$ of updated covariance matrix 570 are equal to the elements in the second to last row of covariance matrix 520, with the exception of element $e_{(L-1),L}$ being zero, as previously mentioned.

As a result of the similarity transformation, element $e_{L,L}$ of updated covariance matrix 570 has the same value as the $b_{(L-1),(L-1)}$ of covariance matrix 520.

Additionally, element $e_{(L-1),(L-1)}$ of updated covariance matrix 570 is updated to be equal to (e.g., replaced with) a predefined value. In some embodiments, the predefined value corresponds to an error associated with a technique of acquiring the quantized measurements (e.g., $LSB^2/12$ for a quantization error that is expected to follow a normal distribution).

FIGS. 6A-6D depict a flowchart of a method 600 for determining an estimated position of an object 110 (e.g., mobile object 110, FIG. 1), according to some embodiments. In some embodiments, method 600 is implemented by navigation apparatus 200, under the control of instructions stored in memory 210 (FIG. 2) that are executed by one or more processors (202, FIG. 2) of navigation apparatus 200. Each of the operations shown in FIGS. 6A-6D corresponds to computer readable instructions stored in a computer readable storage medium of memory 210 in an information processing device or system, such as navigation apparatus 200. The computer readable instructions are in source code, assembly language code, object code, or other instruction format that is interpreted and/or executed by the one or more processors 202 of navigation apparatus 200.

Navigation apparatus 200 (FIG. 2) receives (610), over time, navigation information that includes a sequence of quantized measurements. The navigation information corresponds to a position or a change in position of the object 110 (e.g., mobile object 110). In some embodiments, each quantized measurement has a corresponding quantization error and the quantization error of each quantized measurement is negatively correlated with the quantization error of one or more prior quantized measurements in the sequence of quantized measurements (see portion 544 of sensitivity matrix 540 in FIG. 5B). For example, the quantized measurements may be "clicks" received from a wheel encoder that produces N "clicks" (e.g., 100 clicks) per revolution of a wheel of the mobile object's propulsion system, and each "click" corresponds to a change in the least significant bit (LSB) of the measurement conveyed by the encoder to the measurement receiver 216.

At a sequence of times that are separated by time intervals, navigation apparatus 200 (e.g., measurement update module 226 (FIG. 2) of navigation apparatus 200) iteratively performs (620) a navigation update operation, including: determining (630) an estimated state 510 (FIG. 5A) of the object 110 and an estimated state covariance matrix 520 (FIG. 5C) of the object 110 for a current time (e.g., a $k^{th}$ time, corresponding to a $k^{th}$ iteration of the navigation update operation) in the sequence of times based on an estimated state and estimated state covariance matrix of the object for a prior time (e.g., a $(k-1)^{th}$ time, corresponding to a $(k-1)^{th}$ iteration of the navigation update operation) in the sequence of times. As described above, the estimated state 510 of the object 110 includes a first portion 512 (FIG. 5A) that includes at least estimated position values (e.g., x, y, z) and estimated velocity values (e.g., $v_x$, $v_y$, $v_z$), and a second portion 514 (FIG. 5A) that includes an interval end quantization error value (e.g., $\varepsilon_{end}$, FIG. 5A) and an interval start quantization error (e.g., $\varepsilon_{start}$, FIG. 5A). The estimated state covariance matrix 520 of the object 110 includes a first portion 522 (FIG. 5C) that includes covariance values for the first portion of the estimated state, and a second portion 524 (FIG. 5C) that includes end and start covariance values (e.g., $\Delta\varepsilon_{end}$ and $\Delta\varepsilon_{start}$, respectively, FIG. 5C) corresponding to the interval end and interval start quantization error values, respectively, in the second portion of the estimated state. Details regarding the elements of covariance matrix 520 are provided above with respect to FIG. 5C.

As part of the navigation update operation (620), navigation apparatus 200 (e.g., error update module 228 (FIG. 2) of the navigation apparatus 200) replaces (640) the interval start quantization error value in the estimated state with the interval end quantization error value determined in a prior iteration (e.g., the immediately prior iteration) of the navigation update operation. An example is described above with respect to FIG. 5D, where the interval start quantization error value for the $(k+1)^{th}$ iteration (e.g., $\varepsilon_{start}^{k+1}$ in estimated state 560) is replaced by the interval end quantization error value determined in the $k^{th}$ iteration (e.g., $\varepsilon_{end}^{k}$ in estimated state 510).

As part of the navigation update operation (620), navigation apparatus 200 (measurement update module 226 (FIG. 2) of the navigation apparatus 200) also updates (650) the estimated state 510 and the estimated state covariance matrix 520 in accordance with a predefined Kalman filter update operation (e.g., using Kalman gain function 530, FIG. 5B) to generate an updated estimated state 560 of the object 110 and an updated estimated state covariance matrix 570 of the object 110 for the current time (e.g., the $(k+1)^{th}$ iteration). An example is described above with respect to FIGS. 5D and 5E. The updated estimated state 560 of the object 110 for the $(k+1)^{th}$ iteration is shown in FIG. 5D and the updated estimated covariance matrix 570 for the object 110 $(k+1)^{th}$ iteration is shown in FIG. 5E. The estimated state 560 for the $(k+1)^{th}$ iteration is determined based on the estimated state 510 for the $k^{th}$ iteration. The elements of updated covariance matrix 570 for the $(k_{+1})^{th}$ iteration are determined by a similarity transformation, shown in equation (2) and the estimated covariance matrix 520 for the $k^{th}$ iteration.

In some embodiments, as described above with respect to FIG. 4, updating (650) the estimated state and the estimated state covariance matrix includes updating (652) the estimated state and the estimated state covariance matrix, using the predefined Kalman filter update operation, in accordance with a most recent quantized measurement in the sequence of quantized measurements.

In some embodiments, covariance matrix update module 230 of the navigation apparatus 200 replaces (660) an element of the estimated state covariance matrix corresponding to the interval end quantization error value with a first predefined value. An example is described above with respect to FIG. 5E: the $e_{(L-1),(L-1)}$ element of covariance matrix 570 for the $(k+1)^{th}$ iteration is replaced with a predefined value. In some embodiments, the predefined value corresponds to an error associated with a technique of acquiring the quantized measurements (e.g., $LSB^2/12$ for a quantization error that is expected to follow a normal distribution).

In some embodiments, in addition to replacing (640) the interval start quantization error value in the estimated state with the interval end quantization error value determined in a prior iteration of the navigation update operation, navigation apparatus 200 (e.g., covariance matrix update module 230 of navigation apparatus 200) replaces (670) an element of the estimated state covariance matrix corresponding to the interval start quantization error value with a covariance value determined in a prior iteration of the navigation update operation. An example is described above with respect to FIG. 5E: the $e_{L,L}$ element of covariance matrix 570 for the $(k+1)^{th}$ iteration is updated to have the same value as the $b_{(L-1)(L-1)}$ of covariance matrix 520 for the $k^{th}$ iteration.

In some embodiments, navigation apparatus 200 (e.g., error update module 228 of the navigation apparatus 200) replaces (680) the interval end quantization error value in the estimated state with a second predefined value. In some embodiments, the second predefined value is zero. For example, the interval end quantization error value in the estimated state 560 (e.g., $\varepsilon_{end}^{k+1}$, FIG. 5D) is replaced with a predefined value. In some cases, the interval end quantization error value in the estimated state 560 is replaced a value of zero (e.g., replaced with zero), indicating that the interval end quantization error value in the estimated state 560 is to be calculated in accordance with a Kalman filter update operation for the $(k+1)^{th}$ iteration.

In some embodiments, navigation apparatus 200 (e.g., measurement update module 226 of navigation apparatus 200) uses (654) a Kalman gain function (e.g., Kalman gain function 530, FIG. 5B) that includes a noise measurement matrix 550 (FIG. 5B) corresponding to the first measurement receiver (e.g., of the one or more measurement receivers 216, a measurement received configured to receive quantized measurements), and the noise measurement matrix 550 corresponding to the first measurement receiver is zero. An example is provided above with respect to FIG. 5B.

In some embodiments, navigation apparatus 200 (e.g., measurement update module 226 of navigation apparatus 200) uses (656) a Kalman gain function (e.g., Kalman gain function 530, FIG. 5B) that includes a sensitivity matrix 540 (FIG. 5B). The sensitivity matrix 540 includes an interval end quantization error sensitivity value corresponding to the interval end quantization error value and an interval start quantization error sensitivity value corresponding to the interval start quantization error value. The interval end quantization error sensitivity value and the interval start quantization error sensitivity value are equal in magnitude and opposite in sign. For example, as shown in FIG. 5B, portion 544 of sensitivity matrix 540 shows that the interval end quantization error sensitivity value is equal to 1 and the interval start quantization error sensitivity value is equal to −1.

In some embodiments, navigation apparatus 200 (e.g., measurement update module 226 of navigation apparatus 200) generates (690) one or more figures of merit and each figure of merit is based on one or more diagonal elements of the estimated state covariance matrix. For example, as described above with respect to FIG. 5C, a figure of merit for an attribute (e.g., a position-related attribute) of mobile object 110 can be calculated based on one or more diagonal elements of covariance matrix 520. In some embodiments, the figure of merit is similar to a "standard deviation" that quantifies the extent to which the estimated position is lacking in reliability. In some embodiments, as discussed above, the figure of merit is reported, along with at least a portion of the estimated state, to a reporting apparatus internal to or external to navigation apparatus 200.

In some embodiments, navigation apparatus 200 (e.g., measurement update module 226 of navigation apparatus 200) reports (692) at least a portion of the estimated state of the object to a reporting apparatus 206 (FIG. 2). For example, once the measurement update module 226 determines or generates the estimated state 232 or 510 (FIGS. 2 and 5A, respectively) at least a portion of the estimated state 510, such as elements of the estimated state corresponding to a position-related attribute (e.g., one or more elements corresponding to a position, velocity, attitude and/or acceleration) of the object 110, is reported to the reporting apparatus 206. In a specific example, after performing an iteration of the navigation update process, the measurement update module 226 reports out the position (e.g., using x, y, and z, or latitude, longitude and altitude) of the object 110 to the reporting apparatus 206. In a second example, the measurement update module 226 reports out the velocity (in x, y, and z, or latitude, longitude and altitude) of the object 110 to the reporting apparatus 206 at predetermined time intervals (e.g., every 10 iterations of the navigation update process, or at half second, 1 second, 2 seconds, 5 seconds, or 60 second intervals).

In some embodiments, performing (620) the navigation update operation includes generating (e.g., calculating, determining, computing) a current state (e.g., $x_k^-$ shown in equation (1)) based on an estimated state determined in a preceding iteration (e.g., previous iteration, most recent iteration) and one or more dynamics models (e.g., physics equations) of the mobile object 110 (see operation 420 in FIG. 4). The navigation update operation also includes receiving a quantized measurement at a measurement receiver of the one or more measurement receivers 216 (see operation 440 in FIG. 4) and generating (e.g., calculating, determining, computing) the estimated state 510 of the mobile object 110 based on the current state (e.g., $x_k^-$ shown in equation (1)), the quantized measurement, and a Kalman gain function 530 (see equation (1), described above with respect to FIG. 4). The navigation update operation further includes outputting the estimated state 510 of the mobile object 110 (see operation 460 in FIG. 4), for example to a reporting apparatus internal or external to navigation apparatus 200.

As described above, navigation apparatus 200 performs (620) a navigation update operation (e.g., a Kalman filter update) using quantized measurements to update the estimated position of object 110. In some embodiments, additional information regarding the position of object 110, such as GPS signals or radar information, may also be used to determine the estimated position of object 110. Thus, the estimated position of object 110 may be determined using two or more measurement methods (e.g., using an encoder which provides quantized information and using GPS signals). In such embodiments, the estimated position of object 110 is determined using quantized measurements as described above with respect to FIGS. 6A-6D, where the quantization error associated with the quantized measurements are modeled in the estimated state (e.g., Kalman state), and the estimated position of object 110 determined using other measurements (e.g., non-quantized measurements, such as GPS signals or radar information), is determined in accordance with a traditional Kalman update operation. In some embodiments, the navigation update operation performed using quantized measurements may be performed independently of the traditional Kalman update operation. In some embodiments, the navigation update operation performed using quantized measurements may be performed in parallel with the traditional Kalman update operation so that the estimated position determined using quantized measurements can continue to provide updates to the estimated position of object 110 in between estimated position updates using GPS signals or when GPS signals are weak, for example.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A navigation apparatus for determining an estimated position of an object, comprising:
   one or more measurement receivers for receiving navigation information corresponding to a position or change in position of the object, wherein a first measurement receiver of the one or more measurement receivers receives, over time, navigation information comprising a sequence of quantized measurements, each having a corresponding quantization error;
   one or more processors;
   memory storing one or more programs, the one or more programs including instructions for, iteratively, at a sequence of times separated by time intervals, performing a navigation update operation, including:
      determining an estimated state of the object and an estimated state covariance matrix of the object for a current time in the sequence of times based on an estimated state and estimated state covariance matrix of the object for a prior time in the sequence of times, wherein
         the estimated state of the object includes a first portion that includes at least estimated position values and estimated velocity values, and a second portion that includes an interval end quantization error value and an interval start quantization error value;
         the estimated state covariance matrix of the object includes a first portion that includes covariance values for the first portion of the estimated state, and a second portion that includes end and start covariance values corresponding to the interval end and interval start quantization error values, respectively, in the second portion of the estimated state; and
      determining the estimated state of the object and the estimated state covariance matrix of the object for the current time comprises:
         replacing the interval start quantization error value in the estimated state with the interval end quantization error value determined in a prior iteration of the navigation update operation; and
         updating the estimated state and the estimated state covariance matrix in accordance with a predefined Kalman filter update operation to generate the estimated state of the object and the estimated state covariance matrix of the object for the current time.

2. The navigation apparatus of claim 1, wherein the quantization error of each quantized measurement is negatively correlated with the quantization error of one or more prior quantized measurements in the sequence of quantized measurements.

3. The navigation apparatus of claim 1, wherein updating the estimated state and the estimated state covariance matrix comprises updating the estimated state and the estimated state covariance matrix, using the predefined Kalman filter update operation, in accordance with a most recent quantized measurement in the sequence of quantized measurements.

4. The navigation apparatus of claim 1, wherein determining the estimated state of the object and the estimated state covariance matrix of the object for the current time includes replacing an element of the estimated state covariance matrix corresponding to the interval end quantization error value with a first predefined value.

5. The navigation apparatus of claim 1, wherein determining the estimated state of the object and the estimated state covariance matrix of the object for the current time, includes replacing an element of the estimated state covariance matrix corresponding to the interval start quantization error value with a covariance value determined in a prior iteration of the navigation update operation.

6. The navigation apparatus of claim 1, wherein determining the estimated state of the object and the estimated state covariance matrix of the object for the current time includes replacing the interval end quantization error value in the estimated state with a second predefined value.

7. The navigation apparatus of claim 1, wherein:
   updating the estimated state and the estimated state covariance matrix in accordance with the predefined Kalman filter update operation includes using a Kalman gain function that includes a noise measurement matrix corresponding to the first measurement receiver; and the noise measurement matrix corresponding to the first measurement receiver is zero.

8. The navigation apparatus of claim 1, wherein:

updating the estimated state and the estimated state covariance matrix in accordance with the predefined Kalman filter update operation includes using a Kalman gain function that includes a sensitivity matrix;

the sensitivity matrix includes an interval end quantization error sensitivity value corresponding to the interval end quantization error value and an interval start quantization error sensitivity value corresponding to the interval start quantization error value; and the interval end quantization error sensitivity value and the interval start quantization error sensitivity value are equal in magnitude and opposite in sign.

9. The navigation apparatus of claim 1, wherein the one or more programs including instructions for generating one or more figures of merit, each figure of merit based on one or more diagonal elements of the estimated state covariance matrix.

10. The navigation apparatus of claim 1, wherein:

the estimated state covariance matrix further includes covariance values for any of: sensor bias errors, attitude of the object, and sensor errors.

11. The navigation apparatus of claim 1, wherein the one or more programs including instructions for reporting at least a portion of the estimated state of the object to a reporting apparatus.

12. The navigation apparatus of claim 1, wherein the object is a mobile object.

13. The navigation apparatus of claim 1, wherein the time intervals separating the sequence of times have a predetermined value.

14. The navigation apparatus of claim 1, wherein the object includes at least one of the one or more measurement receivers.

15. A method for determining an estimated position of an object, the method comprising:

at a navigation apparatus for determining an estimated position of an object:

receiving navigation information corresponding to a position or change in position of the object, including receiving, over time, navigation information comprising a sequence of quantized measurements, each having a corresponding quantization error;

at a sequence of times separated by time intervals, iteratively performing a navigation update operation, including:

determining an estimated state of the object and an estimated state covariance matrix of the object for a current time in the sequence of times based on an estimated state and estimated state covariance matrix of the object for a prior time in the sequence of times, wherein the estimated state of the object includes a first portion that includes at least estimated position values and estimated velocity values, and a second portion that includes an interval end quantization error value and an interval start quantization error value;

the estimated state covariance matrix of the object includes a first portion that includes covariance values for the first portion of the estimated state, and a second portion that includes end and start covariance values corresponding to the interval end and interval start quantization error values, respectively, in the second portion of the estimated state; and determining the estimated state of the object and the estimated state covariance matrix of the object for the current time comprises:

replacing the interval start quantization error value in the estimated state with the interval end quantization error value determined in a prior iteration of the navigation update operation; and updating the estimated state and the estimated state covariance matrix in accordance with a predefined Kalman filter update operation to generate the estimated state of the object and the estimated state covariance matrix of the object for the current time.

16. The method of claim 15, wherein the quantization error of each quantized measurement is negatively correlated with the quantization error of one or more prior quantized measurements in the sequence of quantized measurements.

17. The method of claim 15, wherein updating the estimated state and the estimated state covariance matrix comprises updating the estimated state and the estimated state covariance matrix, using the predefined Kalman filter update operation, in accordance with a most recent quantized measurement in the sequence of quantized measurements.

18. The method of claim 15, wherein determining the estimated state of the object and the estimated state covariance matrix of the object for the current time includes replacing an element of the estimated state covariance matrix corresponding to the interval end quantization error value with a first predefined value.

19. The method of claim 15, wherein determining the estimated state of the object and the estimated state covariance matrix of the object for the current time, includes replacing an element of the estimated state covariance matrix corresponding to the interval start quantization error value with a covariance value determined in a prior iteration of the navigation update operation.

20. A non-transitory computer readable storage medium storing one or more programs including instructions that, when executed by one or more processors of a navigation apparatus for determining an estimated position of an object, cause the navigation apparatus to perform operations comprising:

receiving navigation information corresponding to a position or change in position of the object, including receiving, over time, navigation information comprising a sequence of quantized measurements, each having a corresponding quantization error;

at a sequence of times separated by time intervals, iteratively performing a navigation update operation, including:

determining an estimated state of the object and an estimated state covariance matrix of the object for a current time in the sequence of times based on an estimated state and estimated state covariance matrix of the object for a prior time in the sequence of times, wherein the estimated state of the object includes a first portion that includes at least estimated position values and estimated velocity values, and a second portion that includes an interval end quantization error value and an interval start quantization error value;

the estimated state covariance matrix of the object includes a first portion that includes covariance values for the first portion of the estimated state, and a second portion that includes end and start covariance values corresponding to the interval end and interval start quantization error values, respectively, in the second portion of the estimated state; and determining the estimated state of the object and the estimated state covariance matrix of the object for the current time comprises:

replacing the interval start quantization error value in the estimated state with the interval end quantization error value determined in a prior iteration of the navigation update operation; and updating the estimated state and the estimated state covariance matrix in accordance with a predefined Kalman filter update operation to generate the estimated state of the object and the estimated state covariance matrix of the object for the current time.

* * * * *